(12) United States Patent
Ross et al.

(10) Patent No.: US 10,324,905 B1
(45) Date of Patent: *Jun. 18, 2019

(54) PROACTIVE STATE CHANGE ACCEPTABILITY VERIFICATION IN JOURNAL-BASED STORAGE SYSTEMS

(71) Applicant: Amazon Technologies, Inc., Seattle, WA (US)

(72) Inventors: Andrew Wayne Ross, Seattle, WA (US); Artem Danilov, Kirkland, WA (US); Timothy Daniel Cole, Seattle, WA (US); Tate Andrew Certain, Seattle, WA (US); Christopher Richard Jacques De Kadt, Seattle, WA (US); John Michael Morkel, Seattle, WA (US); Allan Henry Vermeulen, Corvallis, OR (US)

(73) Assignee: Amazon Technologies, Inc., Seattle, WA (US)

( * ) Notice: Subject to any disclaimer, the term of this patent is extended or adjusted under 35 U.S.C. 154(b) by 874 days.

This patent is subject to a terminal disclaimer.

(21) Appl. No.: 14/833,009

(22) Filed: Aug. 21, 2015

(51) Int. Cl.
*G06F 16/18* (2019.01)
*G06F 16/23* (2019.01)
*G06F 16/28* (2019.01)

(52) U.S. Cl.
CPC ...... *G06F 16/1805* (2019.01); *G06F 16/1865* (2019.01); *G06F 16/23* (2019.01); *G06F 16/283* (2019.01); *G06F 16/284* (2019.01)

(58) Field of Classification Search
CPC ......... G06F 17/30371; G06F 17/30351; G06F 17/30578; G06F 17/30595; G06F 17/30876; G06F 16/1805; G06F 16/23; G06F 16/284; G06F 16/1865; G06F 16/283

See application file for complete search history.

(56) References Cited

U.S. PATENT DOCUMENTS

| | | | |
|---|---|---|---|
| 5,335,343 A | 8/1994 | Lampson et al. |
| 7,127,716 B2 | 10/2006 | Jin et al. |
| 7,668,876 B1 | 2/2010 | Kulkarni |
| 7,730,034 B1 | 6/2010 | Deflaux et al. |
| 7,792,693 B2 | 9/2010 | Bultmeyer et al. |

(Continued)

OTHER PUBLICATIONS

Invitation to Pay Additional Fees for PCT/US2015/049470, dated Dec. 1, 2015, Amazon Technologies, Inc., pp. 1-10.

(Continued)

*Primary Examiner* — James Trujillo
*Assistant Examiner* — Jessica N Le
(74) *Attorney, Agent, or Firm* — Robert C. Kowert; Meyertons, Hood, Kivlin, Kowert & Goetzel, P.C.

(57) ABSTRACT

A particular node of a journal-based multi-node distributed storage system requests the addition of an acceptability verification request entry to the journal, indicating a proposed state change of the system. The particular node examines contents of entries added to the journal after the acceptability verification request entry. After determining that a targeted set of acceptability verification response entries have been added to the journal, indicating that the potential state change meets acceptance criteria at respective other nodes of the system, the particular node requests an addition of a committed transaction entry to the journal, indicating an approval of the proposed state change.

21 Claims, 17 Drawing Sheets

(56) References Cited

U.S. PATENT DOCUMENTS

| | | | |
|---|---|---|---|
| 7,908,311 | B2 | 3/2011 | O'Loughlin et al. |
| 7,949,662 | B2 | 5/2011 | Farber et al. |
| 8,019,849 | B1 | 9/2011 | Lopilato et al. |
| 8,055,711 | B2 | 11/2011 | Fachan et al. |
| 8,078,582 | B2 | 12/2011 | Wang et al. |
| 8,108,343 | B2 | 1/2012 | Wang et al. |
| 8,209,213 | B2 | 6/2012 | Raisanen |
| 8,510,270 | B2 | 8/2013 | Pareek et al. |
| 8,548,945 | B2 | 10/2013 | Dwyer et al. |
| 8,650,155 | B2 | 2/2014 | Corbin et al. |
| 8,676,752 | B2 | 3/2014 | Kundu et al. |
| 9,990,391 | B1* | 6/2018 | Cole ............... G06F 17/30371 |
| 10,031,935 | B1* | 7/2018 | Cole ............... G06F 17/30351 |
| 2007/0162516 | A1 | 7/2007 | Thiel et al. |
| 2007/0234293 | A1* | 10/2007 | Noller ............... G06F 11/3688 717/124 |
| 2007/0245107 | A1* | 10/2007 | Kano ............... G06F 11/1435 711/163 |
| 2009/0077164 | A1 | 3/2009 | Phillips et al. |
| 2010/0057826 | A1 | 3/2010 | Chow et al. |
| 2010/0332448 | A1 | 12/2010 | Holenstein et al. |
| 2011/0161391 | A1 | 6/2011 | Araujo et al. |
| 2011/0276977 | A1 | 11/2011 | van Velzen et al. |
| 2012/0079490 | A1 | 3/2012 | Bond et al. |
| 2012/0166407 | A1 | 6/2012 | Lee et al. |
| 2014/0304380 | A1 | 10/2014 | Waas et al. |
| 2014/0379715 | A1* | 12/2014 | Kesselman ....... G06F 17/30598 707/737 |
| 2016/0350392 | A1* | 12/2016 | Rice ............... G06F 17/30339 |
| 2017/0046377 | A1* | 2/2017 | Barber ............. G06F 17/30377 |

OTHER PUBLICATIONS

Ozgur Ulusoy, "Processing Real-Time Transactions in a Replicated Datebase System", Distributed and Parallel Datebases, vol. 2, No. 4, Sep. 10, 1993, pp. 405-436.

Philip A. Bernstein, et al., "Concurrency Control and Recovery in Database Systems", Retrieved from the Internet URL: https://courses.cs.washington.edu/courses/cse490h/11wi/CSE490H_files/CSE550BHG-Ch7.pdf, Jan. 1987, pp. 1-58.

U.S. Appl. No. 14/316,680, filed Jun. 26, 2014, Allan Henry Vermeulen.

U.S. Appl. No. 14/316,674, filed Jun. 26, 2014, Allan Henry Vermeulen et al.

U.S. Appl. No. 14/316,630, filed Jun. 26, 2014, Allan Henry Vermeulen.

U.S. Appl. No. 14/491,454, filed Jun. 26, 2014, Allan Henry Vermeulen et al.

U.S. Appl. No. 14/316,622, filed Jun. 26, 2015, Allan Henry Vermeulen et al.

U.S. Appl. No. 14/316,619, filed Jun. 26, 2015, Allan Henry Vermeulen.

U.S. Appl. No. 14/482,661, filed Sep. 10, 2014, Allan Henry Vermeulen.

U.S. Appl. No. 14/482,677, filed Sep. 10, 2014, Allan Henry Vermeulen et al.

U.S. Appl. No. 14/482,668, filed Sep. 10, 2014, Allan Henry Vermeulen et al.

U.S. Appl. No. 14/491,444, filed Sep. 19, 2014, Allan Henry Vermeulen et al.

U.S. Appl. No. 14/491,371, filed Sep. 19, 2014, Allan Henry Vermeulen et al.

U.S. Appl. No. 14/537,788, filed Nov. 10, 2014, Lei Ye et al.

U.S. Appl. No. 14/579,742, filed Dec. 12, 2014, Christopher Richard Jacques De Kadt et al.

U.S. Appl. No. 14/657,043, filed Mar. 13, 2015, Upendra Bhalchandra Shevade et al.

U.S. Appl. No. 14/753,475, filed Jun. 29, 2015, Allan Henry Vermeulen et al.

U.S. Appl. No. 14/753,484, filed Jun. 29, 2015, John Michael Morkel et al.

U.S. Appl. No. 14/753,495, filed Jun. 29, 2015, Timothy Daniel Cole et al.

U.S. Appl. No. 14/753,505, filed Jun. 29, 2015, Allan Henry Vermeulen et al.

U.S. Appl. No. 14/833,008, filed Aug. 21, 2015, John Michael Morkel et al.

U.S. Appl. No. 14/833,001, filed Aug. 21, 2015, Timothy Daniel Cole et al.

U.S. Appl. No. 14/833,000, filed Aug. 21, 2015, Timothy Daniel Cole et al.

U.S. Appl. No. 14/833,005, filed Aug. 21, 2015, John Michael Morkel et al.

U.S. Appl. No. 14/833,003, filed Aug. 21, 2015, Timothy Daniel Cole et al.

U.S. Appl. No. 141868,275, filed Sep. 28, 2015, Timothy Daniel Cole et al.

U.S. Appl. No. 14/868,271, filed Sep. 28, 2015, Timothy Daniel Cole et al.

Sergio Almeida, et al., "ChainReaction: a Causal + Consistent Datastore based on Chain Replication", Apr. 15-17, 2013, pp. 85-98.

Scott Lystig Fritchie, "Chain Replication in Theory and in Practice", Sep. 30, 2010, pp. 1-11.

Robbert Van Renesse, et al., "Chain Replication for Supporting High Throughput and Availability", 2004, pp. 91-104.

"Blackboard System", Wikipedia, Accessed Dec. 3, 2014, pp. 1-5.

Wikipedia, "Apache Wave", Downloaded May 8, 2015, pp. 1-9.

"Git-Rewriting History", http://gitscm.com/book/en/v2/GitToolsRewritingHistory, Downloaded May 8, 2015, pp. 1-10.

David Roundy, "Darcs User Manual", http://darcs.net/maunual/bigpage.html, Downloaded May 7, 2015, pp. 1-87.

Wikipedia, "Operational Transformation", Downloaded May 8, 2015, pp. 1-9.

"Samza", http://samza.apached.org/, Downloaded Jun. 3, 2015, p. 1.

Wikipedia, "SipHash", Downloaded May 31, 2015, pp. 1-3.

U.S. Appl. No. 14/868,267, filed Sep. 28, 2015, Timothy Daniel Cole et al.

International Search Report and Written Opinion, dated Dec. 7, 2015, Amazon Technologies, Inc., pp. 1-11.

* cited by examiner

PROACTIVE STATE CHANGE ACCEPTABILITY VERIFICATION IN JOURNAL-BASED STORAGE SYSTEMS

BACKGROUND

In recent years, more and more computing applications are being implemented in distributed environments. A given distributed application may, for example, utilize numerous physical and/or virtualized servers spread among several data centers of a provider network, and may serve customers in many different geographical locations. In many cases, particularly in cloud-based computing environments, a given application may involve performing reads and writes at several different data stores, such as various instances of relational databases, non-relational databases, and the like. Some commonly used data store architectures may support the traditional ACID (atomicity, consistency, isolation and durability) properties associated with the relational data model for operations within a given data store, but may not support such properties for groups of operations involving multiple data stores. Other data store architectures may not natively support the ACID property even within groups of operations directed to a single data store instance.

Developers of applications that would benefit from support for transactions that cross data store boundaries are sometimes forced to implement their own transaction management mechanisms. Such ad-hoc mechanisms are often hard to maintain, especially as the set of object types at the different data stores evolve based on changing application requirements, and as more features are added to the distributed applications themselves. In some cases, not all the data stores may provide support for the same sets of primitive types, or the same kinds of data manipulation operations, which may further complicate the task of managing complex transactions. Furthermore, given the network delays and various types of failures that may be encountered in typical distributed environments over time, some transaction management techniques may not be robust enough to support the service levels required for mission-critical operations.

Figure 1:
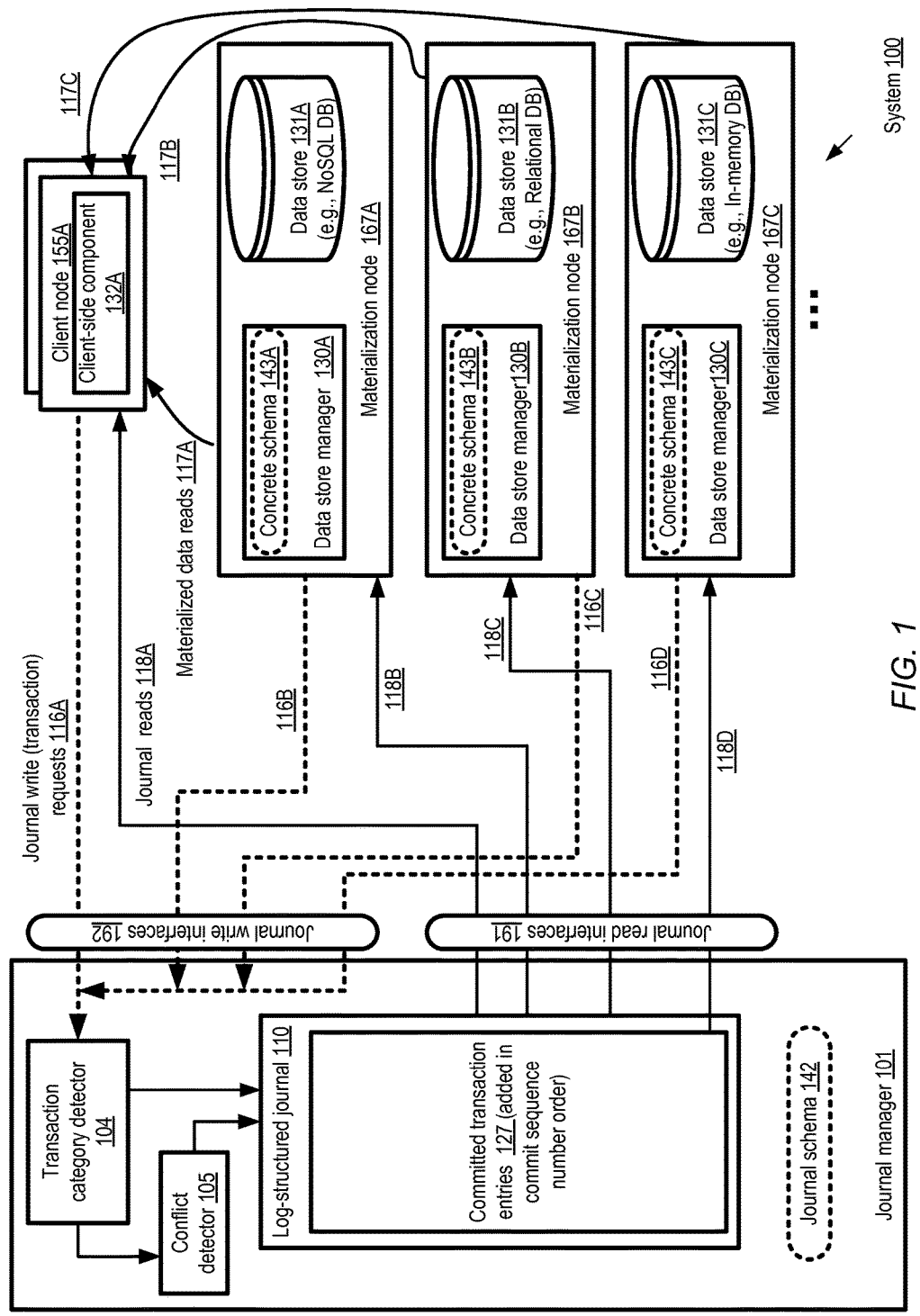
FIG. 1 illustrates an example system environment in which a journal-based multi-data-store database may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing a proactive acceptability verification protocol for state changes using a journal of a multi-data-store database are described. In at least some embodiments, a plurality of data stores, some of which may implement different data models and data manipulation languages than others, and some of which may materialize different subsets of the database content than others, may be registered as respective materialization nodes or members of the database. In various embodiments, client-side components of the database may prepare transaction requests representing proposed state changes to the database locally, and then submit them to a journal manager for commit decisions in accordance with an optimistic concurrency control protocol. If a particular state change indicated in a transaction request is accepted for commit by the journal manager, a corresponding committed transaction entry may be added to a journal of the database, and the writes indicated in the committed transaction entries of the journal may be propagated to some subset or all of the data stores.

A number of different categories of state changes may be supported in some embodiments, including at least one category (e.g., database metadata-related changes, such as changes to a journal schema which defines a transaction language used for preparing transaction requests) for which a client-side component may at least in some cases verify whether one or more materialization nodes are capable of processing the state changes, before submitting the state changes to a journal manager of the database for approval. For other categories of state changes (such as writes to at least some data objects, which may not have as widespread an impact as database metadata changes), a client-side component may not verify acceptability before submitting the state changes to the journal manager.

In various embodiments, a protocol which relies on special-purpose transaction requests and corresponding special-purpose journal entries for acceptability verification of proposed state changes may be implemented. Acceptability-related entries may be added to the journal on behalf of both types of entities involved in acceptability verification: the entity requesting acceptability verification (e.g., the client-side component which generates the proposed state change) as well as the corresponding verifying entities (e.g., respective data store managers of the materialization nodes at which the proposed state change is to be materialized if/when the change is approved). In effect, the journal may be used (in addition to its primary purpose of serving as an authoritative source of the database state) as a persistent and asynchronous communication pathway for state change acceptability verification purposes in at least some embodiments. A request for verifying that the proposed state change can be successfully processed may first be appended to the journal as a special type of journal entry by the journal manager. That acceptability request entry may be read by each verifying entity, e.g., during the verifying entity's normal course of sequentially processing journal entries for materializing various database objects. The verifying entity may determine whether it is capable of processing the state change (without actually implementing or applying the state change), and may submit a response to the journal manager. The response may be positive (indicating that the verifying entity can process the state change indicated in the acceptability verification request without encountering errors), or negative (indicating that the verifying entity cannot guarantee that the state change indicated in the acceptability verification request can be processed successfully). The journal manager may append a corresponding acceptability verification response entry (e.g., one instance of another special type of journal entry) to the journal. The acceptability verification request entry and the corresponding response entry may be considered examples of respective special categories of committed transaction entries of the journal, e.g., entries for which read-write conflict detection and/or other commit analysis operations normally performed by the journal manager for state-changing transactions need not be performed. As with other types of committed transaction entries, acceptability verification request entries and acceptability verification response entries may each be assigned respective sequence numbers by the journal manager, indicating the order in which the entries were inserted in the journal.

The proposer of the state change may examine the journal for responses to the acceptability verification request. If all the targeted verifying entities have responded positively (as indicated by respective entries in the journal) within a selected time period, in various embodiments a transaction request requesting a normal commit analysis of the proposed state change may be submitted to the journal manager. If the journal manager approves the requested state change, the state change may be committed and a corresponding entry indicating the commit may be appended to the journal. After the entry indicated the commit is added to the log, the state changes or writes indicated therein may eventually be applied at the appropriate set of verifying entities such as one or more materialization nodes.

Thus, with respect to some database state changes, at least two types of checking may be performed before the changes take effect. First, a preliminary check may be performed, using journal entries as the means of communication, to determine whether various nodes of the database can process the state change without encountering errors. In effect, in the preliminary check, each of the various nodes may be asked to indicate (without actually making permanent changes to locally materialized data or metadata potentially affected by the state change) whether that node would be able to apply the state change locally, if the state change were actually to be approved in the future by the commit management components of the system such as the journal manage. Then, normal commit analysis (e.g., based on read-write conflict detection in accordance with an optimistic concurrency control protocol implemented by the journal manager) may be performed. If either type of checking has a negative result—e.g., if one or the materialization nodes cannot process the proposed state change, or if a read-write conflict is detected—the proposed state change may be abandoned or rejected in various embodiments. In contrast, if both types of checking succeed—e.g., if all materialization nodes can process the proposed state change, and if no read-write conflict is detected—the proposed change may be committed. The protocol used for acceptability verification may be used for various types of state changes in some embodiments, e.g., including changes to the journal schema as described below and/or for changes to selected (or all) data objects. Further details with respect to the acceptability verification protocol are provided below.

Generally speaking, at least some state changes or write operations indicated in a transaction request which is not an acceptability verification related request (e.g., a request including a write to a data object, or a modification to a journal schema) may be based on data that has been read from one or more of the data stores. Information about such reads may be included in the transaction request, e.g., in the form of a read set descriptor, together with an indication of the committed state of a data store from which the data was read. A write set descriptor indicative of the write operations corresponding to the proposed state changes may also be included in a transaction request in various embodiments. The journal manager may perform conflict detection operations based on analysis of the read set descriptor of a received transaction request and on write sets of a subset of journal entries representing previously-committed transactions. If no conflicts are detected, the proposed transaction may be accepted or approved for commit. An entry representing the approval (which may also be referred to as a commit record) may be added or appended to the journal.

The write operation(s) corresponding to a given commit record may be propagated to or materialized at some or all of the data stores, depending for example on the overlap between the particular subsets of the database being materialized at the individual data stores and the contents of the writes. In some implementations, at least some of the writes may be propagated to the data stores asynchronously with respect to the insertions of the journal entries. Changes corresponding to a particular committed transaction may be materialized at several different data stores independently—e.g., one data store may be updated before another. The entries in the journal may collectively represent the authoritative state of the database in various embodiments, with individual journal entries representing respective state changes. In at least some embodiments, a given journal entry may indicate an approved or committed operation which changes the state (e.g., the equivalent of "add X to Y"), and may not necessarily indicate the data values resulting from the state change (e.g., with respect to the state change indicated by "add X to Y", a record indicating Y's value may not be stored in the journal). In various embodiments, once an entry has been made persistent by storing at one or more storage devices of the journal, that entry may no longer be modified or overwritten in place.

A wide variety of data store types may be registered as members of such a journal-based system in different embodiments, including for example one or more instances of relational databases, non-relational or NoSQL databases, in-memory databases, object-oriented databases, storage services which provide web-service interfaces to data objects, storage services which provide block-level programmatic interfaces, and the like. Each data store instance or materialization node may have a corresponding data store manager, implemented for example using some collection of hardware and/or software components, configured to support a respective set of programmatic interfaces in accordance with the syntax and semantics of the associated data store type. In at least some embodiments, for example, some data stores may present different interfaces for read operations, and a client-side component may submit reads to different data stores via their respective read interfaces when preparing a transaction request. The data stores registered at a given time for transaction management via a given logical instance of a journal of a multi-data-store database may be referred to as "member" data stores of that database as of that time. Generally speaking, multiple logical journal instances may be used simultaneously, each associated with a corresponding multi-data-store database with its own member data stores. The terms "multi-data-store database" and "multi-data-store storage system" may be used synonymously herein. Of course, a given storage system or database may, at least at some points in time, comprise just a single member data store—that is, while multiple members may be permitted, the storage system may not be required to have multiple members.

In various embodiments, some of the primitive data types supported at one data store may not be supported at another. For example, integer values may be stored using 64 bits in one data store, and using 32 bits in another. Similarly, the implementation and precision of real numbers may differ from one data store to another. The manner in which text variables or attributes are handled may differ across data stores in some cases—e.g., the maximum supported length of a character array may differ, support for variable-length character arrays or strings may differ, and so on. The details of the implementation of binary objects (e.g., "blobs"), such as the maximum size of binary objects, etc., may differ from one store to another. Some data stores may not offer the same kinds of data manipulation operations as others. Furthermore, in at least some embodiments, the kinds of indexes, constraints and/or other metadata objects which may be supported may differ from one data store to another. In various embodiments, a data-store-independent or data-store-agnostic transaction language may be employed for transaction requests submitted to the journal manager, e.g., to ensure that such differences among the different data stores can be managed.

A common journal schema may be employed in some embodiments, indicating rules regarding acceptable transaction requests which can be submitted to the journal manager by various nodes of the system, including client-side components and/or data store managers. Such rules may, for example, indicate the syntax of the transaction language, the kinds of transactions which can be submitted (such as data modification transactions, schema modifying transactions, acceptability verification requests/responses, and so on). With respect to acceptable values for the attributes of data objects, the journal schema may support "maximally-overlapping" attribute value ranges with respect to the individual data stores, as described below in further detail. For example, if one member data store supports 64-bit integers, and another member data store supports only 32-bit integers, the journal schema may only permit 32-bit integers. The journal schema may also be referred to as the abstract or generic schema of the database, while the respective schemas of the individual data stores, from which the journal schema may be derived in some embodiments, may be referred to as "concrete" or data-store-specific schemas.

The journal schema of the storage system itself may evolve over time, e.g., as new data objects and/or new object attributes are added, or if new features or capabilities are added to the data-store-independent transaction language. Generally speaking, if the storage system comprises N data stores at a given point in time, the approval of the corresponding N data store managers may be required (e.g., using the acceptability verification protocol mentioned above) for a new version of the journal schema to be adopted. A multi-data-store storage system in which the journal-based acceptability verification protocol is implemented with respect to journal schema changes may be considered one example of a more general multi-node distributed system with a replicated state machine, in which new rules for representing state change requests may be proposed by one of the nodes in one journal entry, and approvals from some subset or all of the other nodes are obtained via respective journal entries before the new rules can take effect. In some embodiments, for any given journal schema change indicated in an acceptability verification request, each node whose approval is required or requested may check whether the change to the journal schema change is compatible with the local concrete schema of that node (and/or the version of the journal schema which is currently in effect). For example, if the journal schema change comprises an addition of a data object with an attribute of a data type DT1 which is not supported in the concrete schema of a given data store DS1 at which that data object is to be materialized, the journal schema change may not meet the acceptance criterion of DS1, and a negative response to the acceptability verification request may be submitted for insertion into the journal. In contrast, if the respective acceptance criterion for the journal schema change are met at all the targeted other nodes (e.g., if all the nodes at which the data object is to be materialized can support DT1 in the above example), positive responses to the acceptability verification requests may be appended to the journal on behalf of each of the nodes. The node that requested the acceptability verification may then confirm, using the journal, that the journal schema change can be processed successfully at all the targeted nodes, and submit a transaction request with the same journal schema change. The post-acceptability-verification transaction request may be handled by the journal manager in the same manner as other data-modifying or metadata-modifying transaction requests in various embodiments. The terms "approver" and "acceptability verifier" may be used interchangeably herein to refer to a node of the system from which a response to an acceptability verification request for a potential state change is expected or required by a proposer of the state change.

In at least some embodiments as mentioned above, a given journal schema change may include changes to the data-store-independent transaction language which can be used for subsequent transactions. For example, while version V1 of the journal schema is in effect, a set of transaction verbs {verb1, verb2, and verb3} may be permitted in transaction requests accepted by the journal manager, and when version V2 of the journal schema takes effect a different set of transaction verbs (verb1, verb2, verb3 and verb4) may be permitted for subsequent transactions. Using journal schema changes, the permitted set of data objects, the attributes of the data objects, the permitted values of the attributes, as well as the transaction language itself may all be adapted to changing requirements. In at least some embodiments, before a particular write operation is applied at a given data store, the corresponding data store manager may verify that the changes are compliant with the current version of the journal schema (where the current version as known at one data store may temporarily differ from the current version as known at another data store in some cases). In one embodiment, the journal manager may also verify that a transaction request is compliant with the current version of the journal schema, although such verification may not be required in other embodiments. In at least some embodiments, the storage system may rely on an "honor system" with respect to compliance with the journal schema by transaction-submitting components—e.g., client-side components may be expected to keep up with journal schema version changes and prepare transaction requests that comply with the journal schema version currently in effect, but an enforcement mechanism for such compliance may not necessarily be implemented at the journal manager.

In some embodiments, each journal entry may include an indication of a commit sequence number, indicative of an order in which the corresponding request was approved by the journal manager. In one simple example implementation, an integer counter may be incremented by the journal manager every time a transaction request (e.g., either a data modification request, or a journal schema modification request) is approved, and the value of that counter may be included in the commit record entry added to the journal for that request. In some such embodiments, a conflict check delimiter (expressed as a sequence number corresponding to the most-recently-applied commit at a data store from which data was read when preparing the transaction) may be included in a transaction request. The conflict check delimiter may be used by the journal manager to identify the subset of commit records of the journal (i.e., those commit records which have higher sequence numbers than the conflict check delimiter) whose write set descriptors are to be examined to detect conflicts with the transaction proposed in the request. In at least one embodiment, if that subset of commit records includes a particular record corresponding to a journal schema modification, the transaction request may be rejected (e.g., because the version of the journal schema currently in effect differs from the version which was used to prepare the transaction).

Example System Environment

FIG. 1 illustrates an example system environment in which a journal-based multi-data-store database may be implemented, according to at least some embodiments. System 100 shows a journal manager 101 of a log-structured journal 110 that may be used to store records of state changes of a multi-data-store database. The journal manager may be implemented using one or more computing devices in various embodiments. The journal may be described as being log-structured in the depicted embodiment in that it may comprise an append-only sequence of entries, with in-place modification of entries not permitted. The journal may comprise committed transaction entries 127 stored in the order in which the corresponding transactions or state changes were approved, e.g., in increasing order of commit sequence numbers. The database may include one or more materialization nodes 167, such as 167A-167C, at each of which at least a subset of the database contents are materialized. Each materialization node may include a respective data store 131 (e.g., data stores 131A-131C) and a corresponding data store manager (DSM) 130 (e.g., DSMs 130A-130C) implemented at one or more computing devices. A respective concrete schema 143 (e.g., concrete schemas 143A-143C for data stores 131A-131C) may govern the data object types, attribute types and allowed values, and various other aspects of each of the data stores. A journal schema 142 (which may be based on and/or compatible with each of the concrete schemas of the data stores 131) may specify or govern various aspects of transaction management in system 100—e.g., the syntax of a data-store-independent transaction language in which state change requests are to be submitted to the journal manager by client-side components 132, and/or the data types and attributes which can be referenced in such requests. Each data store manager may ensure that any changes made to the journal schema 142 are compatible with the local concrete schema 143 in various embodiments, e.g., as part of the acceptability verification protocol for potential journal schema changes, and thus may have access to both types of schemas. In at least some embodiments, the current journal schema may be stored in materialized form at some or all data stores. Various additional details regarding the journal schema and its relationship with the concrete schemas 143 are provided below.

The data stores 131 may be referred to as member data stores of the database or storage system. The member data stores 131 may differ from each other in various characteristics such as their supported data models and/or data manipulation languages, level of data consistency supported, transaction support, data persistence/durability level, and the like. For example, data store 131A may comprise an instance of a NoSQL or non-relational database that does not implement a standard version of the structured query language (SQL)), data store 131B may comprise an instance of a relational database, and data store 131C may comprise an instance of an in-memory database. Each of the data stores may be registered for transaction management by the journal manager 101 in the depicted embodiment. The terms "concurrency control" and "transaction management", may be used as synonyms herein with respect to the state change management functionality provided by the journal manager. In effect, the journal manager may be responsible for implementing a replicated state machine corresponding to a collection of data objects indicated in a journal schema, with the committed transaction entries expressing state changes in a data-store-independent language in the depicted embodiment. In some embodiments, several different types of entries may be stored in the journal, including entries representing data modifications, journal schema modifications, redactions of other entries, and the like as discussed below in further detail.

The term "data store", as used herein, may refer to an instance of any of a wide variety of persistent or ephemeral data repositories and/or data consumers. For example, some data stores such as 131A may comprise persistent non-relational databases that may not necessarily provide native support for multi-item transactions, while other data stores such as 131B may comprise persistent relational databases that may natively support multi-item transactions. In some embodiments, a network-accessible storage service of a provider network that enables its users to store unstructured data objects of arbitrary size, accessible via a web-services interface, may be registered as one of the data stores. Other types of data stores may comprise in-memory databases such as 131C, instances of a distributed cache, network-accessible block storage services, file system services, and the like.

In the depicted embodiment, the journal manager may implement a set of programmatic interfaces 192 for write requests 116 (e.g., requests 116A from client nodes 155, and requests 116B-116D from materialization nodes 167A-167C), and another set of programmatic interfaces 191 for journal reads 118 (e.g., reads 118A from client nodes 155 and reads 118B-118D from materialization nodes 167A-167C). Programmatic interfaces 191 and 192 may, for example, comprise respective collections of APIs (application programming interfaces) in various embodiments, although access to the journal may also be provided using web-based consoles, command-line tools, and the like in some embodiments.

As mentioned above, a variety of transaction categories (corresponding to respective journal write request categories) may be supported in some embodiments. For example, the set of transaction categories may include data modifications, journal schema modifications, acceptability verification requests, acceptability verification responses, redactions, and so on. For at least some data modifications, a client-side component such as 132A may construct transaction requests locally without invoking the acceptability verification protocol, and then submit (or "offer") the transaction requests for approval and commit by the journal manager 101 in the depicted embodiment.

In contrast, for at least some journal schema modifications, acceptability verification from some subset or all of the materialization nodes 167 may be required before a transaction request to commit the changes is submitted, so a client-side component such as 132A may first submit an acceptability verification request to the journal manager indicating the changes via a write interface 192. In at least some embodiments, the changes may be indicated using the same data-store-independent transaction language that is used for data modification transaction requests or schema modification transaction requests. A journal entry indicating that acceptability verification of a potential or proposed state change is requested (which may be referred to herein as an AVReq entry) may be appended to the journal by the journal manager 101. In at least some embodiments, the AVReq entry may also indicate a validity period (e.g., a time period during which the requester will check for acceptability verification responses in the journal, and after which the acceptability request expires).

Each of the approver/verifier nodes (e.g., some or all materialization nodes 167 of FIG. 1) may typically examine the journal entries in sequential order in the depicted embodiment using read interfaces 191. When an approver node processes an AVReq entry during its sequential analysis of the journal 110, it may check whether the changes indicated in the request can be successfully processed, without actually applying or materializing the changes locally. If the acceptance criteria for local processing are met, the approver node may send a positive acceptability verification response to the journal manager via a write interface 192; otherwise, a negative response may be sent. The journal manager may append AVResp (acceptability verification response) entries to the journal corresponding to each approver node's response. In embodiments in which validity periods are assigned to each AVReq, an approver node may only check acceptability for state changes indicated in AVReqs whose validity period has not yet expired—e.g., expired AVReq entries may be ignored with respect to acceptability verification checking. The submitter of the AVReq may check (e.g., as long as the AVReq remains valid), using a read interface 191, whether positive AVResps have been appended to the journal from each of a targeted set of approver nodes. If the targeted set of positive AVResp entries is detected, the submitter of the AVReq may submit a transaction request (via a write interface 192) to commit the changes whose acceptability has been verified by the approver nodes. In at least some embodiments, the transaction request of the acceptance-verified state changes may be handled in the same way by the journal manager as transaction requests for state changes whose acceptance has not been verified (e.g., the same type of commit analysis involving read-write conflict detection operations may be performed in both cases). If an insufficient number of positive AVResp entries are found in the journal during the validity period of the AVReq entry, the state changes indicated in the AVReq entry may be abandoned.

The category of a given received transaction request 116 may be identified at a category detector 104 of the journal manager in the depicted embodiment. For some types of transactions, such as data-modifying or schema-modifying transactions, a conflict detector 105 of the journal manager 101 may be involved in the commit analysis of the transaction request, while for acceptability verification related transactions, conflict detection may not be required. Thus, for example, an acceptability verification request transaction or an acceptability verification response transaction may be "committed" automatically in the depicted embodiment—e.g., an AVReq or AVResp entry may be appended to the journal without performing conflict detection. In other embodiments, the conflict detector 105 may not necessarily be bypassed for acceptability-related transactions—instead, for example, the conflict detector may simply approve acceptability-related transactions for commit based on their transaction category alone.

In at least one embodiment, the acceptability verification mechanism comprising the use of AVReq and AVResp entries may also be used for other purposes. For example, a client-side component may wish to determine responsiveness metrics from one or more data store managers, indicating how long it is taking the data store managers to process newly-added journal entries. In such a scenario, an AVReq with a null or zero-length set of potential state changes may be submitted to the journal manager, and a corresponding AVReq entry may be appended to the journal with a sequence number assigned by the journal manager. When a given data store manager encounters such an AVReq entry, a positive response may be submitted to the journal, and a corresponding AVResp entry with a different (higher) sequence number may be appended. The difference between the sequence numbers of the AVReq entry and the AVResp entry may provide an indication of the delay between the appending of a journal entry and the processing of that entry by the given data store manager. The indication of the delay may be considered a metric of the responsiveness of the data store manager, i.e., of its ability to keep up with state changes being approved for the database by the journal manager. In some embodiments, the AVReq/AVResp mechanism may be used simply to obtain a list of active data store managers of the system (i.e., to determine which data store managers are reading and responding to journal entries).

In general, in at least some embodiments, a given data-modifying or journal schema-modifying transaction request 116 may include a read set descriptor indicating one or more reads 117 of materialized versions of data objects at one or more data stores, and a write set descriptor indicating proposed writes which may eventually be propagated to one or more data stores, where the set of data stores that are read in the transaction may or may not overlap with the set of data stores affected by the writes. The reads may be performed using the native programmatic read interfaces of the data stores in some embodiments. The transaction requests 116 may be formatted in accordance with a data-store-independent transaction language indicated or referenced in journal schema 142 in various embodiments. The client-side components 132 may obtain the latest version of the journal schema 142 directly from the journal manager (e.g., via read interfaces 191) and/or via reads from the materialization nodes 167 from which materialized versions of the journal schema may be obtained in a manner similar to the way materialized versions of various data objects are obtained. In at least one embodiment, a journal manager 101 may maintain a materialized version of the journal schema which can be obtained by various client-side components 132. In some embodiments, a client-side component 132 may itself include a module capable of materializing a journal schema 142 after examining a set of journal entries indicating respective journal schema changes. In at least some embodiments, the journal manager may not necessarily check whether a submitted transaction request is compliant with the current version of journal schema 142—instead, the client-side components 132 may be responsible for ensuring that their requests are formatted in accordance with the journal schema. In other embodiments, the journal manager may verify that a transaction request complies with the current version of the journal schema, and may reject requests that do not comply.

At least some of the writes indicated in a given transaction request may be dependent on the results of one or more of the reads in some embodiments. For example, a requested transaction may involve reading one value V1 from a location L1 at a data store DS1, a second value V2 from a second location L2 at a data store DS2, computing a function F(V1, V2) and storing the result of the function at a location L3 at some data store DS3. In some locking-based concurrency control mechanisms, exclusive locks may have to be obtained on L1 and L2 to ensure that the values V1 and V2 do not change before L3 is updated. In contrast, an optimistic concurrency control mechanism may be used by the journal manager 101 of FIG. 1, in which no locks may have to be obtained. Instead, in the depicted embodiment, the conflict detector 105 may determine, based at least in part on the contents of the transaction request and on a set of committed transaction entries of the journal 110, whether one or more of the data items read in the requested transaction may have been updated since they were read from their respective data stores. A sequence number based technique may be used to determine whether such read-write conflicts exist in at least some embodiments, as described below in further detail. If the conflict detector 105 determines that none of results of the proposed transaction's reads have been affected by subsequently committed writes, the requested transaction may be accepted for commit, and records representing such accepted-for-commit transactions 114 may be added to the journal 110. The terms "approve" and "accept" may be used as synonyms herein with respect to requested transactions that are not rejected.

If some of the transaction's read data was updated since the corresponding reads occurred (or if a probability that the data was updated is estimated by the conflict detector to be greater than a threshold), a requested transaction may instead be rejected or aborted in the depicted embodiment.

This type of approach to concurrency control may be deemed optimistic in that decisions as to whether to proceed with a set of writes of a transaction may be made initially under the optimistic assumption that read-write conflicts are unlikely. As a result, in scenarios in which read-write conflicts are in fact infrequent, higher throughputs and lower response times may be achieved than may be possible if more traditional locking-based techniques are used. In the case where a transaction is accepted for commit, in some embodiments contents of a corresponding journal entry 127 may be replicated at some number of nodes of a replication graph (as described below in further detail with respect to FIG. 14) in the depicted embodiment before the commit is considered successful. In some embodiments, the requesting client-side component 132 may be notified when the requested transaction is committed. In at least one embodiment, the client-side component 132 may be informed when a transaction is rejected, so that, for example, a new transaction request may be generated and submitted for the desired updates.

For each transaction that is committed (including AVReq and AVResp transactions), in at least some embodiments a commit sequence number (or some other identifier indicative of the commit) may be generated and stored as part of the corresponding journal entry. Such a commit sequence number may, for example, be implemented as a counter or as a logical timestamp. The commit sequence number may be determined, for example, by the conflict detector 105 or the transaction category detector 104 in some embodiments, or at a different component associated with the journal (such as the committer node of a replication graph being used) in other embodiments.

In the depicted embodiment, after a given data-modifying or schema-modifying transaction is committed and its entry is stored at the journal, at least some of the writes of the transaction may be applied or propagated to one or more of the materialization nodes 167, e.g., by write appliers or cursors using read interfaces 191. Different subsets of the committed writes may be of interest to, or relevant to, different materialization nodes in some embodiments. In various embodiments, the respective data store managers 130 at the materialization nodes may verify that a given write is compliant with the journal schema 142 (and therefore with the concrete schema 143 of the data store) before the write is applied. In some implementations, the writes may be applied in an asynchronous fashion to the materialization nodes. Thus, in such implementations, there may be some delay between the time at which the transaction is committed and the time at which the payload of a particular write operation of the committed transaction reaches the corresponding data store. In various embodiments, respective asynchronous write appliers may be used to propagate some or all of the writes to relevant data stores. In some embodiments, the write appliers may be components of the journal manager 101, while in other embodiments the write appliers may be components of the data store managers 130, and may represent respective cursors on the journal. After the data written during a transaction is applied to the corresponding data stores, client-side components may be able to read the updated data using the respective read interfaces of the data stores. In some embodiments, at least one of the write appliers may be capable of performing synchronous writes (e.g., either when explicitly directed to do so by the journal manager or a data store manager, or for all the writes for which the applier is responsible).

In at least some embodiments, as described below in further detail, in addition to a read set descriptor and a write set descriptor, a given transaction request 116 which modifies a data object may include the write payload (i.e., the set of data bytes that are to be stored for each write), a conflict check delimiter (an indication of a subset of the committed transaction entries that should be examined to accept/reject the transaction), and/or other elements such as a transaction type indicator. Some or all of these constituent elements of a transaction request may be stored within the corresponding journal entry together with the commit sequence number for the transaction. In at least one embodiment, the journal manager 101 may provide an indication of the latest committed state of the database (such as the highest commit sequence number generated thus far), e.g., in response to a query from a data store manager or a query from a client-side component. The write appliers may indicate the commit sequence numbers corresponding to the writes that they apply in various embodiments. Thus, at any given point in time, a client-side component may be able (e.g., by querying the data store managers) to determine the commit sequence number corresponding to the most-recently-applied write at a given materialization node 167. In at least some embodiments, during the generation of a transaction request 116, the most-recently-applied commit timestamps may be obtained from the data stores that are accessed during the transaction, and one or more of such commit sequence numbers may be indicated in the transaction request as the conflict check delimiter. For example, consider a scenario in which, at the time that a particular client-side component 132 initiates a transaction that includes a read of a location L1 at a data store DS1, the commit sequence number corresponding to the most recently applied write at DS1 is SN1. Assume further that in this example, the read set of the transaction only comprises data of DS1. In such a scenario, SN1 may be included in the transaction request 116. The conflict detector 105 may identify journal entries with sequence numbers greater than SN1 as the set of entries to be examined for read-write conflicts for the requested transaction. If any of the write sets of the identified commit records overlaps with the read set of the requested transaction, the transaction may be rejected/aborted; otherwise, the transaction may be approved for commit in this example scenario. Details regarding the manner in which conflict detection operations may be implemented in various embodiments are provided below.

The optimistic concurrency control mechanism illustrated in FIG. 1 may allow more complex types of atomic operations to be supported than may have been possible using the underlying data stores' concurrency control mechanisms in at least some scenarios. For example, some high-performance non-relational data stores may only allow single-item transactions (i.e., writes may be permitted one at a time, but if multiple writes are submitted in a single batch update, atomicity/consistency guarantees may not be provided for the multiple writes taken together). With the journal-based approach described above, a single transaction that encompasses writes to multiple locations of the non-relational data store (and/or other data stores as well) may be supported with relative ease.

In some embodiments, changes to the journal schema 142 may be proposed by data store managers (via write interfaces 192) instead of or in addition to being proposed by client-side components 132. In such embodiments, a given data store manager may submit an acceptability verification request indicating the changes, and verify that some targeted set of other data store managers have verified the acceptability of the proposed change before submitting a transaction request to commit the change. It is noted that the acceptability verification protocol may also or instead be used for data object modifications (as opposed to journal schema modifications) in some embodiments. In at least one embodiment, data object modifications may also be initiated by data store managers—e.g., data store managers may act as client-side-components of the storage system in addition to materializing data objects. In some embodiments, not all the data store managers may be required to verify acceptability of a state change indicated in an acceptability verification request. Instead, for example, a set of distinguished nodes of the storage system may be designated as required approvers, while acceptability verification by other nodes of the system may not be mandatory. The submitter of the acceptability verification request may be responsible for identifying the set of nodes from whom acceptability responses are required, e.g., by querying a configuration metadata source of the system (not shown in FIG. 1).

Journal Schema Contents

Figure 2:
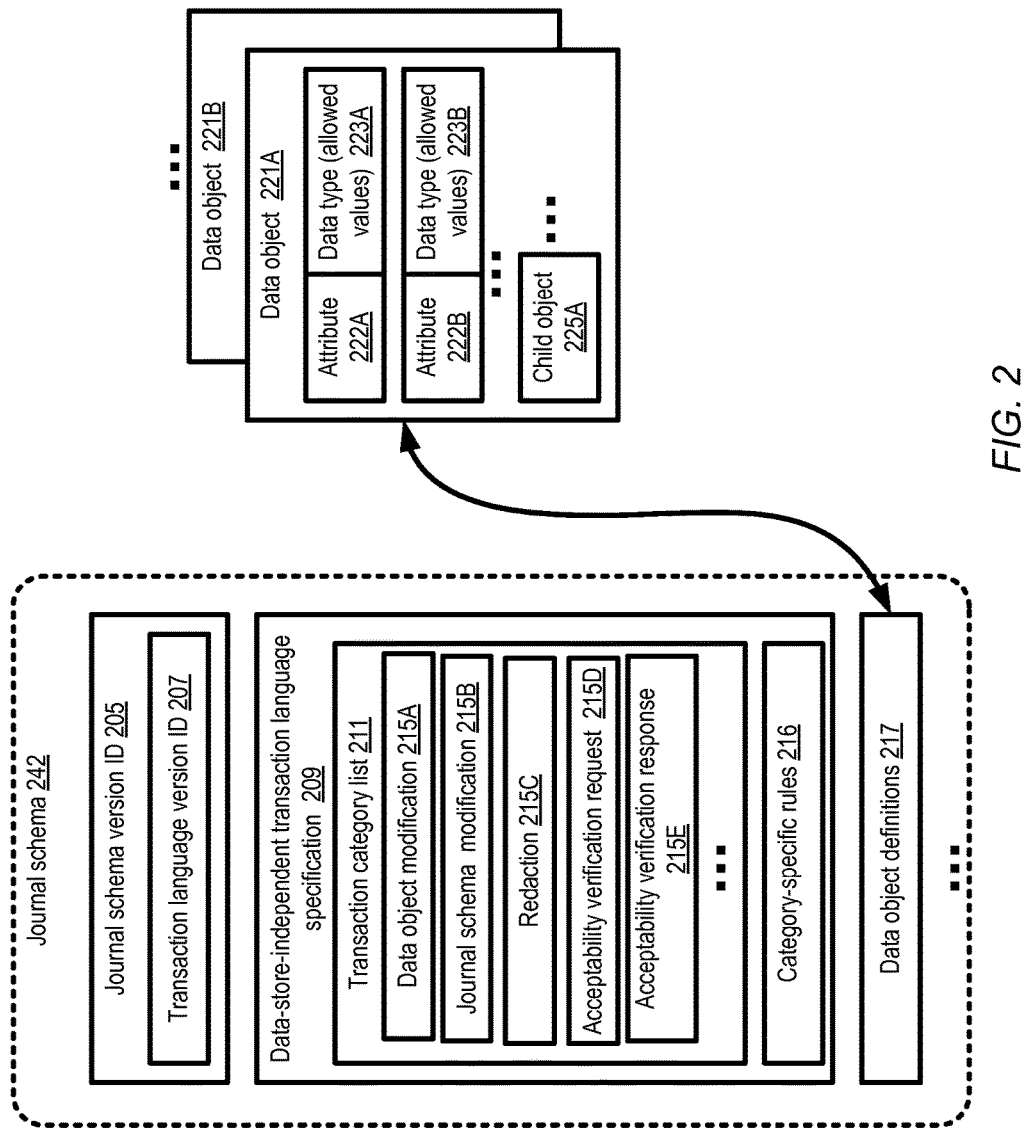
FIG. 2 illustrates examples of elements of a journal schema which may be used at a multi-data-store storage system, according to at least some embodiments.

FIG. 2 illustrates examples of elements of a journal schema which may be used at a multi-data-store storage system, according to at least some embodiments. As shown, a journal schema 242 may contain a version identifier 205 in some embodiments. As mentioned earlier, new versions of the journal schema may take effect after approval by some or all data store managers of the materialization nodes of the storage system in various embodiments. In at least one embodiment, a journal schema 242 may include a specification 209 of a data-store-independent transaction language, which is to be used for preparing transaction requests submitted to a journal manager. In some embodiments, the transaction language may have its own separate version number (e.g., because a change to a journal schema version may not necessarily involve a corresponding change to the transaction language). An identifier 207 of the transaction language version may be included in the journal schema 242 in such embodiments, e.g., either embedded within the journal schema identifier or as a separate element of the journal schema.

A number of different transaction or state change categories may be supported at the storage system in various embodiments. For example, supported transaction categories in category list 211 may include data object modifications 215A, journal schema modifications 215B, redactions 215C, acceptability verification requests 215D, acceptability verification responses 215E, and so on. Corresponding to some or all of the categories, a respective set of category-specific rules 216 may be indicated in the journal schema 242. Each set of rules 216 may for example indicate the acceptable syntax (e.g., the types of transaction verbs such as INSERT, DELETE, UPDATE and the like) for the corresponding types of requests, acceptable format(s) in which the requests are to be expressed, and so on. To prepare a given transaction request, in various embodiments a client-side component may use the category-specific rules of the current version of the journal schema for the corresponding transaction category.

Details regarding the names, attributes and attribute values of data objects of the storage system may be provided in a collection of data object definitions 217. A particular data object such as 221A may include a collection of attributes 222 (e.g., attributes 222A and 222B), each of which may have a data type 223 (e.g., 223A and 223B) indicating a range or set of allowed values, or some other similar indicator of allowed values. In some embodiments, the range of allowed values may be indicated by the name of the data type—e.g., an "int32" data type may indicate that signed integer values which can be expressed using 32 bits are allowed. In various embodiments, the set of values permitted for a given attribute may be determined using a "maximum overlap" approach with respect to the attribute values permitted at the different member data stores. Some data objects may be organized hierarchically (in parent-child relationships) in at least one embodiment—e.g., data object 221A may comprise a set of child objects such as 225A, with each child object having its own attribute set and data types or allowed attribute values. In some embodiments, the data objects 221 may be considered analogous to tables of relational or non-relational databases, with the attributes 222 corresponding to table columns. Journal schemas 242 may comprise additional elements beyond those shown in FIG. 2 in one embodiment, while some of the elements shown in FIG. 2 may not be supported in other embodiments.

In various embodiments, as mentioned above, at least a portion of a journal schema 242 may be based on or derived from a collection of concrete schemas of the member data stores of the storage system. A given data object may be represented using somewhat different attribute data types in the concrete schemas CS1 and CS2 of two member data stores DS1 and DS2 respectively. For example, according to concrete schema CS1, values of attributes Attr1 and Attr2 of a data object may be stored as respective 64-bit integers, and values of attribute Attr3 may be stored as 32-element character arrays. In contrast, at data store DS2, concreate schema CS2 may indicate that Attr1 and Attr2 of the analogous data object are stored as 32-bit integer values, while Attr3 may be stores as a variable-length character array (varchar). The particular details of the attribute values permitted at a given data store may depend on various factors, such as, for example, the limitations on the data types supported at the data store, the choices made by administrators when creating the concrete schemas, and so on. Some popular data stores may only provide support for 32-bit integers, for example for historical reasons, while others may support larger integer ranges.

When generating a journal schema to be shared for transactions associated with both DS1 and DS2, a "maximum overlap" approach towards allowable attribute values may be taken in at least some embodiments. For example, if at least one member data store (e.g., DS2) permits integer values of no more than 32 bits, while all the other data stores (e.g., DS1) support integers of at least 32 bits, then 32-bit integers may be selected for a corresponding integer-valued attribute Attr1 in the journal schema's corresponding data object definition. In this example, an integer represented using 32 bits would be compatible with all the data stores (DS1 and DS2), but an integer expressed using more than 32 bits could not be stored at DS2, so 32 bits represents the maximum common overlap. Similarly, although the varchar version of Attr3 in concrete schema CS2 of DS2 may comprise more than 32 characters, a character array of 32 elements may be used for Attr3 in the journal schema to maintain compatibility with concrete schema CS1 of DS1.

It is noted that in at least some scenarios, the attribute range limitations of a journal schema may not necessarily result from fundamental limitations of the underlying data stores—e.g., it may be the case that character arrays longer than 32 elements may be permitted at DS1, but the data store administrator of DS1 may nevertheless have chosen 32-element arrays as the data types to use for Attr3. In some embodiments, the member data stores may support non-overlapping data types: for example, all numerical quantities at one data store may be stored as objects of type "number", while numerical data types "integer" or "floating-point" may be supported at a different data store. In such scenarios, the journal schema may in some cases define a different data type (e.g., "NumericValue") which represents as much of an overlap as possible between the value ranges of the different data stores' numeric data types.

In various embodiments, the concept of maximal overlap may be also or instead be employed with respect to the set of attributes indicated in the journal schema (i.e., not just for data types or allowable value ranges of the attributes). For example, consider an example scenario in which a given data object in one concrete schema CS1 includes attributes Attr1, Attr2, Attr3 and Attr4, but the corresponding data object of concrete schema CS2 only includes Attr1, Attr2 and Attr3. In such a scenario, Attr4 may be excluded from the journal schema, since values of Attr4 may not be stored in DS2. In some embodiments, a concrete schema of one data store may be modified (e.g., by the corresponding data store administrator) to accommodate data types of other member data stores—for example, in order to accommodate a 64-bit integer attribute of DS1, a combination of two 32-bit integer attributes may be included in a concrete schema of DS2. Of course, additional data object manipulation logic or code may have to be implemented to enable such transformations or extensions—e.g., software routines to convert a 64-bit integer into two 32-bit integers may have to be executed in the above example for each write of the data object.

If the member data stores support different types of data manipulation operations (e.g., different index creation requests), a common set of data manipulation operations that can be supported at all the data stores may be indicated in a transaction language of the journal schema in at least some embodiments. Thus, the approach of including the maximum overlapping functionality of the member data stores in the journal schema may extend to operation syntax in addition to attribute definitions and allowed value ranges.

Journal Schema Evolution

Figure 3:
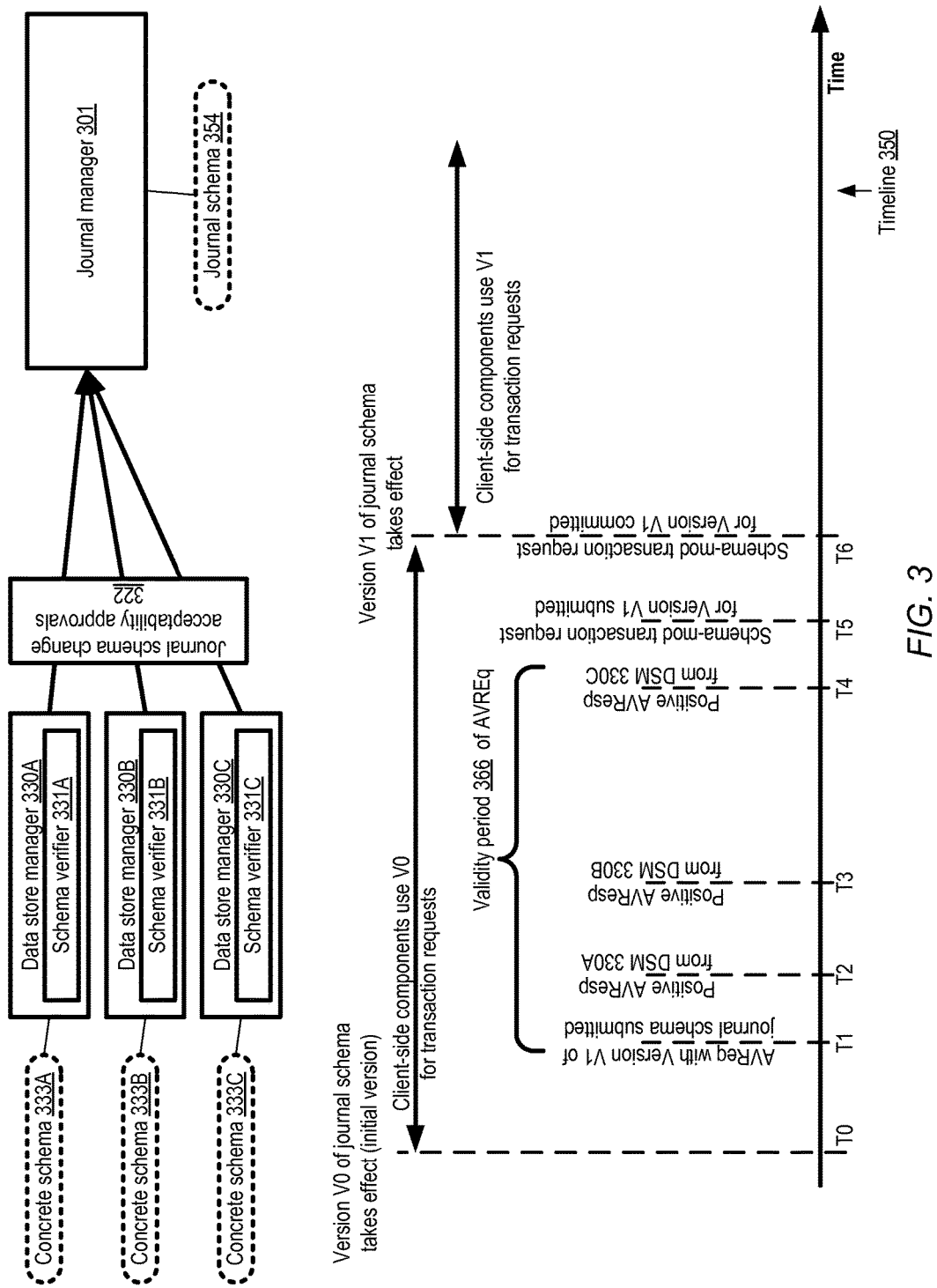
FIG. 3 illustrates an example of a timeline indicating respective periods in which different versions of a journal schema may be in effect at a multi-data-store storage system, according to at least some embodiments.

As mentioned above, at least a subset of the member data stores of a multi-data-store storage system may each have to agree to adopt a new version of a journal schema before that new version becomes effective. FIG. 3 illustrates an example of a timeline indicating respective periods in which different versions of a journal schema may be in effect at a multi-data-store storage system, according to at least some embodiments. The storage system comprises three data stores with respective data store managers 330A, 330B and 330C and respective concrete schemas 333A, 333B and 333C in the depicted embodiment. The journal manager 301 is the authoritative source of the version of the journal schema 354 that is in effect at the storage system at various points in time in the depicted embodiment. Before a new version of the journal schema takes effect, respective acceptability approvals 322 may have to be received (e.g., using the acceptability verification protocol discussed above) from each of the member data store managers 330 in the depicted embodiment. Each data store manager 330 may comprise a respective schema verifier subcomponent 331 (e.g., schema verifiers 331A, 331B and 331C) which checks whether a proposed change to the journal schema is acceptable or compatible with respect to the corresponding concrete schema 333.

Timeline 350 illustrates a series of events which may occur at the storage system, resulting in changes to the version of the journal schema 354. At a time T0 on timeline 350, an initial version V0 of the journal schema takes effect. Time T0 may, for example, correspond to an initialization or bootstrapping stage of the multi-data-store storage system, in which each of the data stores may be brought online. The initial version of the journal schema may be read in, for example, from a respective configuration parameter file or repository in some embodiments by each of the data store managers 330. At time T1, an acceptability request AVReq indicating a new version V1 of the journal schema may be submitted, e.g., by a client-side component (or by one of the data store managers). The data store managers 330B, 330A and 330C may respectively indicate, by transmitting respective positive AVResp messages corresponding to AVReq to the journal manager, that the proposed change is compatible with their respective concrete schemas at times T2, T3 and T4 of timeline 350 in the depicted example. The data store managers 330 may not make any changes to their local versions of the journal schema at this stage. Meanwhile, the original version V0 may remain in effect.

After all three AVResp message have been detected by the AVReq submitter in the journal, a schema-modifying transaction indicating Version V1 of the journal schema may be submitted to the journal manager at time T5. A corresponding transaction entry indicating that Version V1 has been committed may be inserted into the journal at time T6, at which point Version V1 becomes the effective version of the journal schema. Thus, during the interval between T0 and T6, client-side components may format their transaction requests (including the request to change the journal schema version) according to version V0. After version V1 of the journal schema takes effect at time T6, client-side components which submit journal version requests to the journal manager 301 (or to the data store managers) may receive responses indicating the new version V1, and may start formatting their transaction requests in accordance with V1. In embodiments in which the client-side components receive their information regarding journal schemas from the data stores rather than from the journal, there may be some delay between T6 (the time at which a commit record entry associated with the journal schema change from V0 to V1 is added to the journal) and the time at which that commit record is applied or processed at the data stores and becomes readable from the data stores. Generally speaking, different data stores may process the commit entry for the journal schema change at different points in time. If the read set descriptor of a given transaction request spans a journal schema change (that is, if some of the data of the read set was read before a journal schema version change, and other data was read after the journal schema version change), in at least some embodiments the transaction request may be rejected by the journal manager.

In the example illustrated using timeline 350, the AVReq entry has an associated validity period 366. If all three AVResps are not added to the journal before period 366 expires, the submitter of the AVReq may abandon the proposed journal schema change in the depicted embodiment. Thus, an expiration of the validity period of an AVReq before all the targeted responses are received may be considered the logical equivalent of receiving at least one negative AVResp within the validity period in some embodiments. As mentioned above, in some embodiments positive responses may not be required from all the data store managers—instead, a subset of important data store managers may have to provide positive responses for the submitter of the AVReq to proceed with a transaction request for the proposed journal schema change. It is noted that the submission of the transaction request indicating the schema change (e.g., at time T5 in timeline 350) may not necessarily guarantee that the schema change is committed. For example, conflict detection analysis performed by the journal manager may reveal that a conflicting schema change has been committed since the transaction request of time T5 was prepared by the AVReq submitter, in which case the schema change may be rejected instead of being committed.

Asynchronous Application of Committed Writes at Member Data Stores

Figure 4:
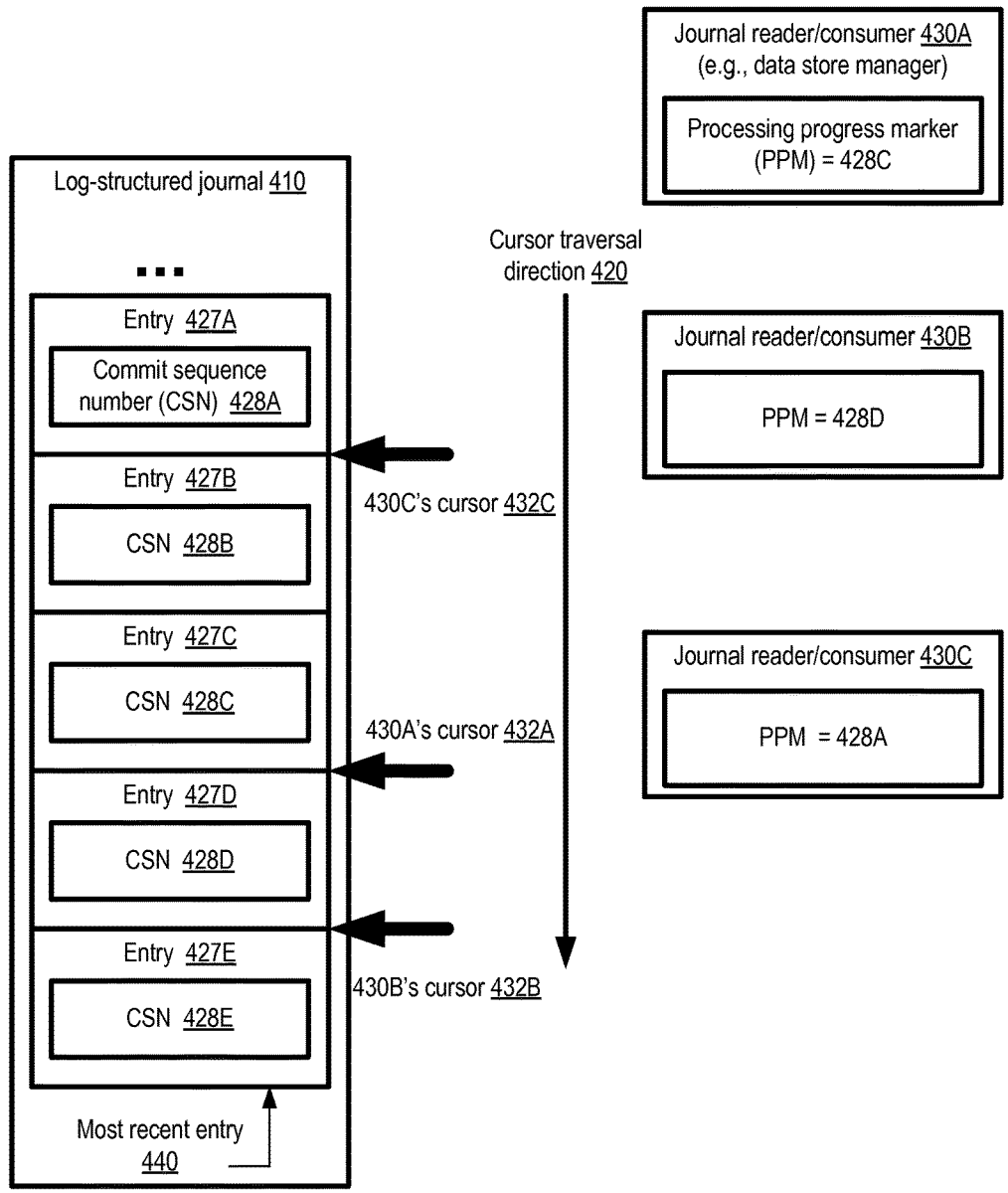
FIG. 4 illustrates an example of asynchronous processing of journal entries by journal entry consumers, according to at least some embodiments.

As mentioned earlier, member data stores may differ from each other in various characteristics, including for example the rate at which they are capable of processing or applying committed state changes. In various embodiments, the member data stores or other journal entry readers/consumers need not always remain synchronized with each other with respect to the replicated state machine represented by the journal set up for the storage system. FIG. 4 illustrates an example of asynchronous processing of journal entries by journal entry consumers, according to at least some embodiments. At a point of time corresponding to FIG. 4, the journal 410 comprises a plurality of entries 427 inserted in order of respective commit sequence numbers (CSNs) 428, with the most recent entry 440 being entry 427E with CSN 428E. The most recent entry may sometimes be referred to as the "head" of the journal.

In effect, each of the data store managers may maintain a cursor onto the sequence of commit entries of the journal, and process the entries in the order in which the entries were inserted into the journal. For example, cursor 432A is established for data store manager (DSM) 430A, cursor 432B is maintained for DSM 430B, and cursor 432C is maintained for DSM 430C in the depicted example. As mentioned above, in some embodiments write applier components of the storage system may propagate the contents of entries of the journal to the DSMs, and in such embodiments each such write applier may correspond to a cursor of the data store to which it propagates the journal entry contents. A write applier may be implemented, for example, as a separate process or thread of execution in some embodiments. As indicated by arrow 420, each of the cursors processes the entries of journal 410 in the same order, e.g., in increasing order of CSNs 428 of the entries. At the point of time illustrated in FIG. 4, entries with CSNs up to 428C have been processed or applied at DSM 430A's data store, entries corresponding to CSNs up to 428D have been processed at DSM 430B, and entries corresponding to CSNs up to 428A have been processed at DSM 430C. A respective processing progress marker (PPM) may be stored or maintained at each DSM in the depicted embodiment, indicating the CSN of the most recent journal entry whose processing has been completed at that DSM. As discussed above, in at least some embodiments, a given journal entry may represent any of several types of changes or communications—e.g., a committed change to a data object, a committed change to a journal schema, an acceptability verification request, an acceptability verification response, a redaction, etc. Depending on the type of a journal entry being processed, different actions may be taken at the DSM. In some embodiments, for at least one category of journal entry (e.g., acceptability verification request entries) a PPM may be advanced without actually completing the processing associated with that entry to avoid certain error scenarios, as discussed below in further detail.

Acceptability Verification Protocol Example

Figure 5:
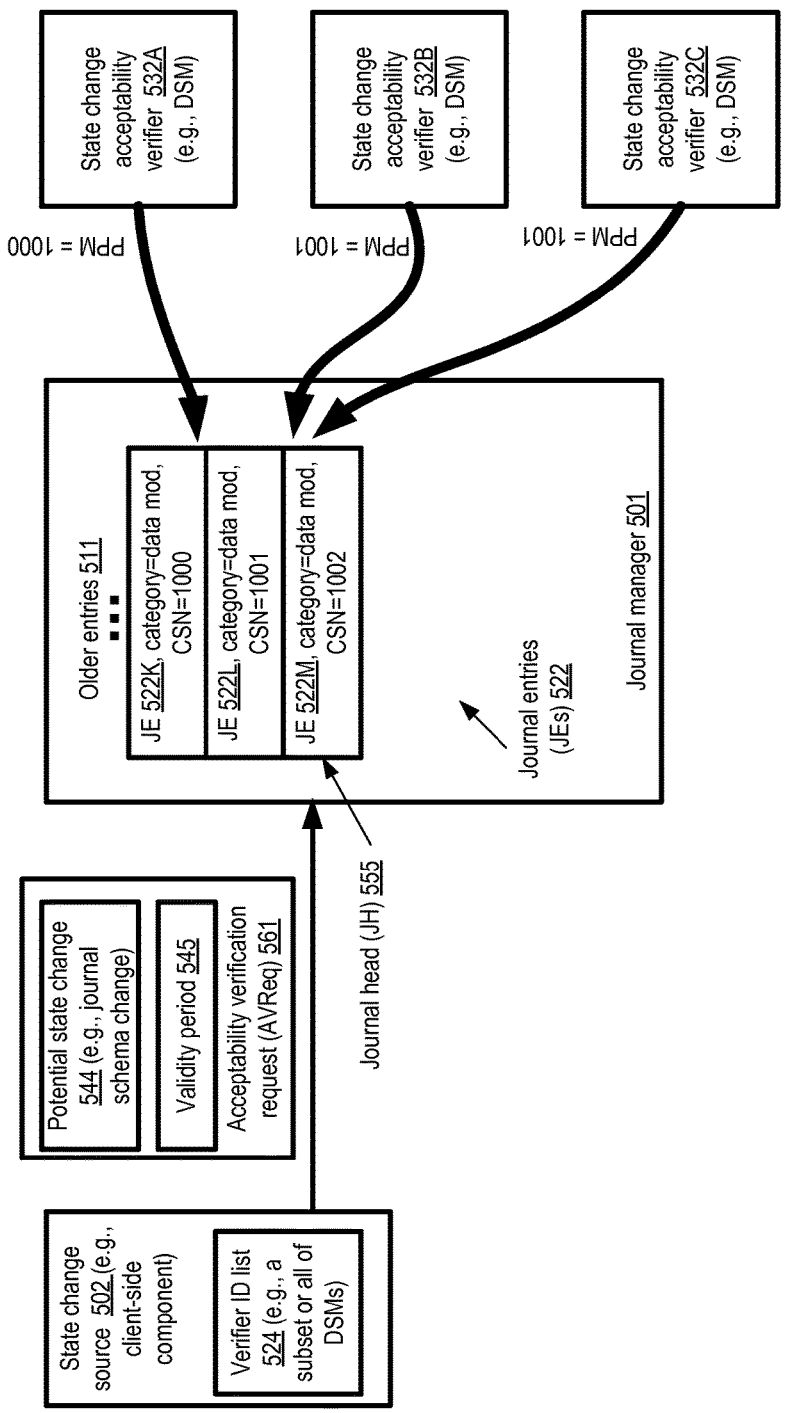
FIG. 5-FIG. 11 collectively illustrate an example of a use of a journal-based acceptability verification protocol for certain types of state changes at a multi-data-store storage system, according to at least some embodiments.

FIG. 5-FIG. 11 collectively illustrate an example of a use of a journal-based acceptability verification protocol for certain types of state changes at a multi-data-store storage system, according to at least some embodiments. As shown in FIG. 5, a state change source 502 (e.g., a client-side component or one of the data store managers) may submit an acceptability verification request (AVReq) 561 to a journal manager 501. The AVReq 561 may include information about a potential state change 544 (such as a change to a journal schema), as well as a validity period 545 in the depicted embodiment. The state change source 502 may store a list 524 of identifiers of a set of verifiers from whom positive responses to the AVReq are to be obtained prior to submitting a request to actually implement the state change 544. For example, a client-side component may collect identifiers of a set of data store managers (DSMs) from which respective positive responses have to be received before the state change itself can be requested. The identifiers may be obtained from a control-plane components of the storage system in one embodiment, e.g., using programmatic query interfaces. In some embodiments, not all the DSMs may be affected by a given state change—e.g., because some DSMs may materialize different subsets of the system's data objects, a particular journal schema change may only affect some subset of the DSMs. As a result, in such scenarios, the list of acceptability verifiers for a given state change may exclude the identifiers of one or more data stores. In at least some embodiments, if the state change source 502 later encounters a journal entry indicating that a response (either positive or negative) to the AVReq was received from an unexpected entity (e.g., from a data store whose identifier is not included in list 524), the proposed state change may be abandoned. Such a conservative approach, in which unexpected responses are treated as the equivalent of negative responses, may be taken in some embodiments because the state changes whose acceptability is being verified may have wide-ranging effects on the system. An unexpected response may indicate that there is some uncertainty (either at the state change source, or at the entity which transmits the unexpected response) regarding the set of entities which should be involved in the verifying the acceptability of a potential state change; therefore, it may not be safe to proceed with the analysis or processing of the state change until the uncertainty is removed. The validity period 545 may be expressed in various types of units in different embodiments—e.g., in wall-clock time units such as seconds or milliseconds, or in sequence number units. A given AVReq 561 and its responses may only be considered applicable or meaningful for the validity period indicated in it in the depicted embodiment. For example, consider a scenario in which AVReq 561 has a 60-second validity period, set to expire at 14:31:00 GMT on a given day. In this scenario, the state change source 502 would only check for responses to AVReq 561 until 14:31:00 GMT on that day. Furthermore, any journal reader (e.g., a DSM) that encounters AVReq 561 after 14:31:00 may, upon discovering that the validity period has expired, abandon further processing of the AVReq.

At the point in time represented in FIG. 5, the three most recently appended journal entries 522 are entries 522K, 522L and 522M, each representing committed data modification ("data mod"), with respective commit sequence numbers (CSNs) 1000, 1001 and 1002. Three state change acceptability verifiers (e.g., DSMs) 532A, 532B and 532C are shown. The acceptability verifiers may represent a subset of the consumers or readers of journal entries 522 in the depicted embodiment, or may represent all the consumers of journal entries other than the state change source 502. Acceptability verifier 532A has completed processing of entries with CSNs of up to 1000 (e.g., older entries 511 and entry 522K), as indicated by its processing progress marker (PPM) 1000. Acceptability verifiers 532B and 532C have each processed entries with CSNs up to 1001, as indicated by their respective PPM values. The head of the journal is at entry 522M with CSN 1002.

Figure 6:
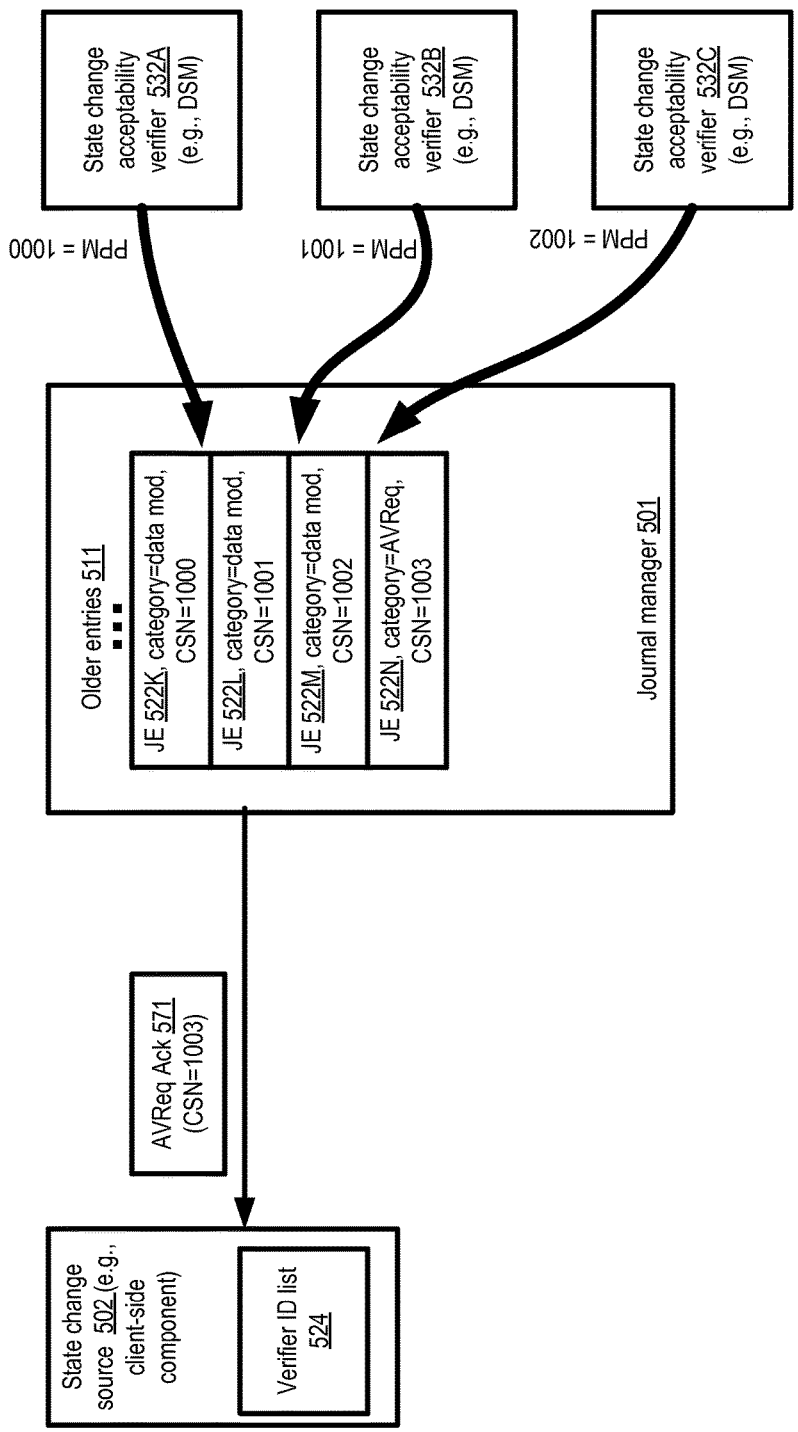

As shown in FIG. 6, in response to receiving AVReq 561, the journal manager 501 may append a new entry 522N to the journal, with entry category "AVReq" and CSN 1003. Entry 522N may include some or all of the elements of AVReq 561, including for example the description or details of the potential state change 544 and the validity period 545. The journal manager may transmit an acknowledgement 571 to the state change source with the CSN of the AVReq entry in at least some embodiments. The AVReq CSN value (1003) may be used in some embodiments by the state change source to determine the minimum offset in the journal at which it should expect to find responses to the AVReq. At the point of time corresponding to FIG. 6, the respective PPMs of the acceptability verifiers 532A, 532B and 532C are 1000, 1001, and 1002—that is, only 532C has made progress with respect to the scenario illustrated in FIG. 5.

Figure 7:
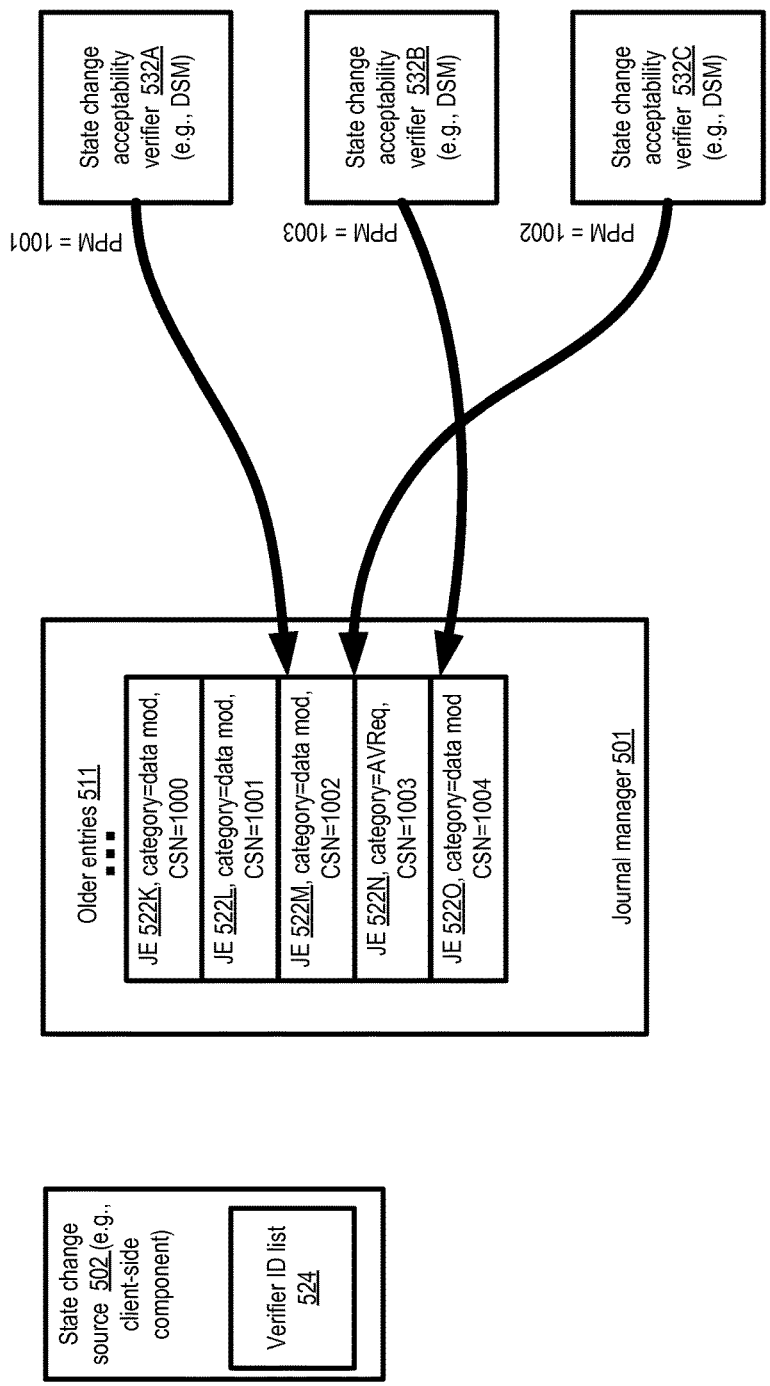

In the state of the system illustrated in FIG. 7, acceptability verifier 532A's PPM has reached 1001 (i.e., 532A has completed processing entry 522L), acceptability verifier 532B's PPM has been set to 1003 (indicating that entry 522N has been processed), and acceptability verifier 532C's PPM is still set to 1002. Another data modification entry 522), with CSN 1004, has been added to the journal by the journal manager (e.g., after performing commit analysis on a data-modifying transaction request received from some state change source). In some embodiments, when a journal entry consumer such as an acceptability verifier 532 encounters an acceptability verification entry such as 522N, the consumer may advance its PPM to indicate that the acceptability verification entry has been processed, without actually completing (or in some cases initiating) the acceptability analysis. This approach may be taken, for example, because the testing of the acceptability of the state change may in some cases lead to an error state from which it is difficult for the consumer to recover. For some such errors, a restart of the journal consumer may be required. If the PPM had not been advanced, the same error-causing journal entry may be processed again after the consumer restarts, leading to the same error followed by another restart, etc. In order to avoid such potentially looping error scenarios, the PPM (which may be stored in persistent storage so that its new value is obtained after the restart) may be advanced to the next CSN before the acceptability testing is performed.

Figure 8:
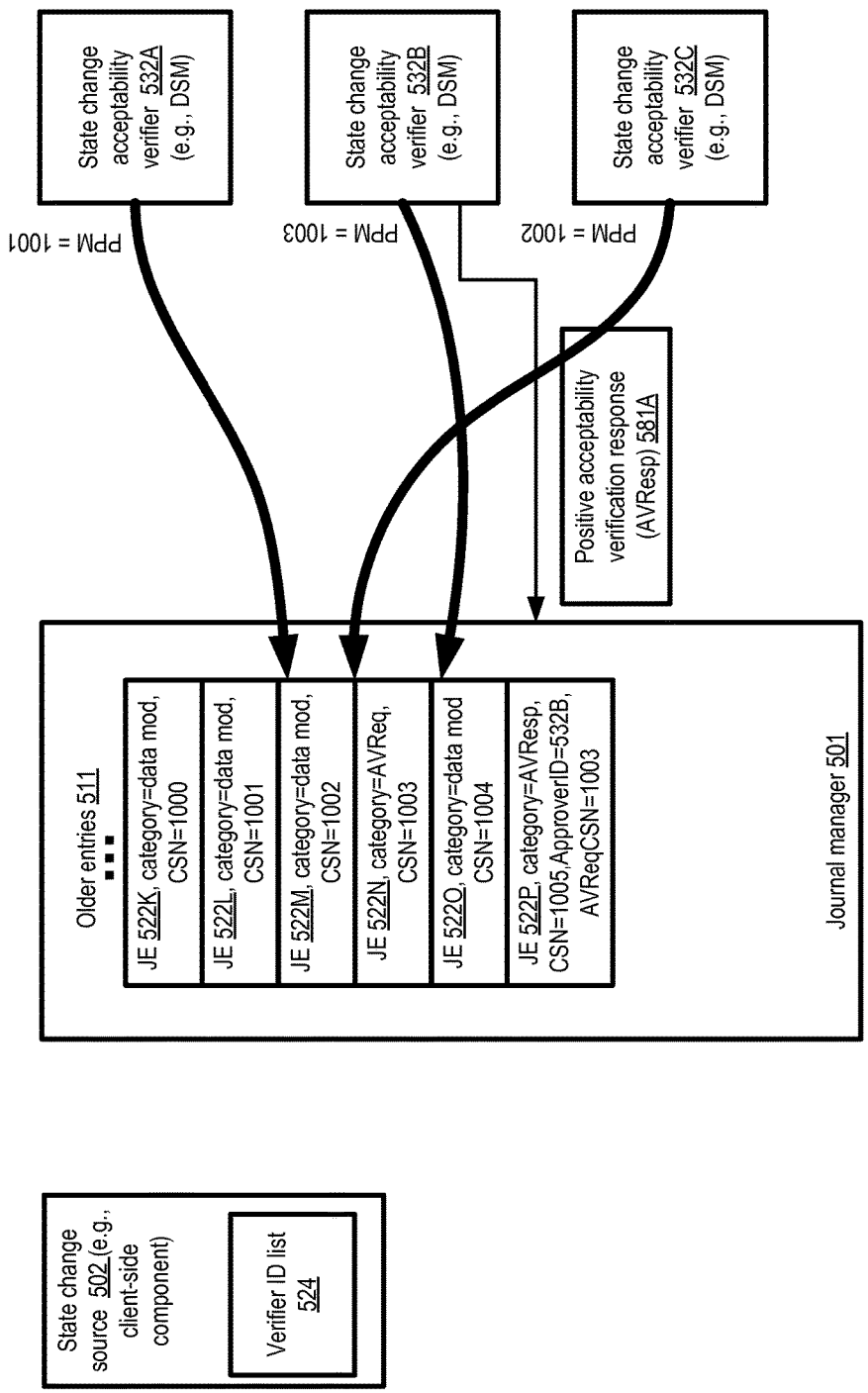

In FIG. 8, the acceptability verifier 532B has completed its testing of acceptability of AVReq entry 522N, and has submitted a positive acceptability verification response (AVResp) 581 to the journal manager. Accordingly, the journal manager has appended journal entry 522P of type AVResp to the journal, with CSN 1005. The entry 522P may also include the identifier of the verifier 532B, and the CSN of the approved AVReq (1003) in the depicted embodiment. Meanwhile, the PPMs of the three acceptability verifiers have the same values as they did in FIG. 7. If the acceptability verifier 532B had found the potential state change indicated in AVReq entry 522N unacceptable, e.g., because a journal schema change indicated in entry t22N is not compatible with the concrete schema in use at the verifier, the AVResp entry 522P may have indicated a negative response from the verifier 532B.

Figure 9:
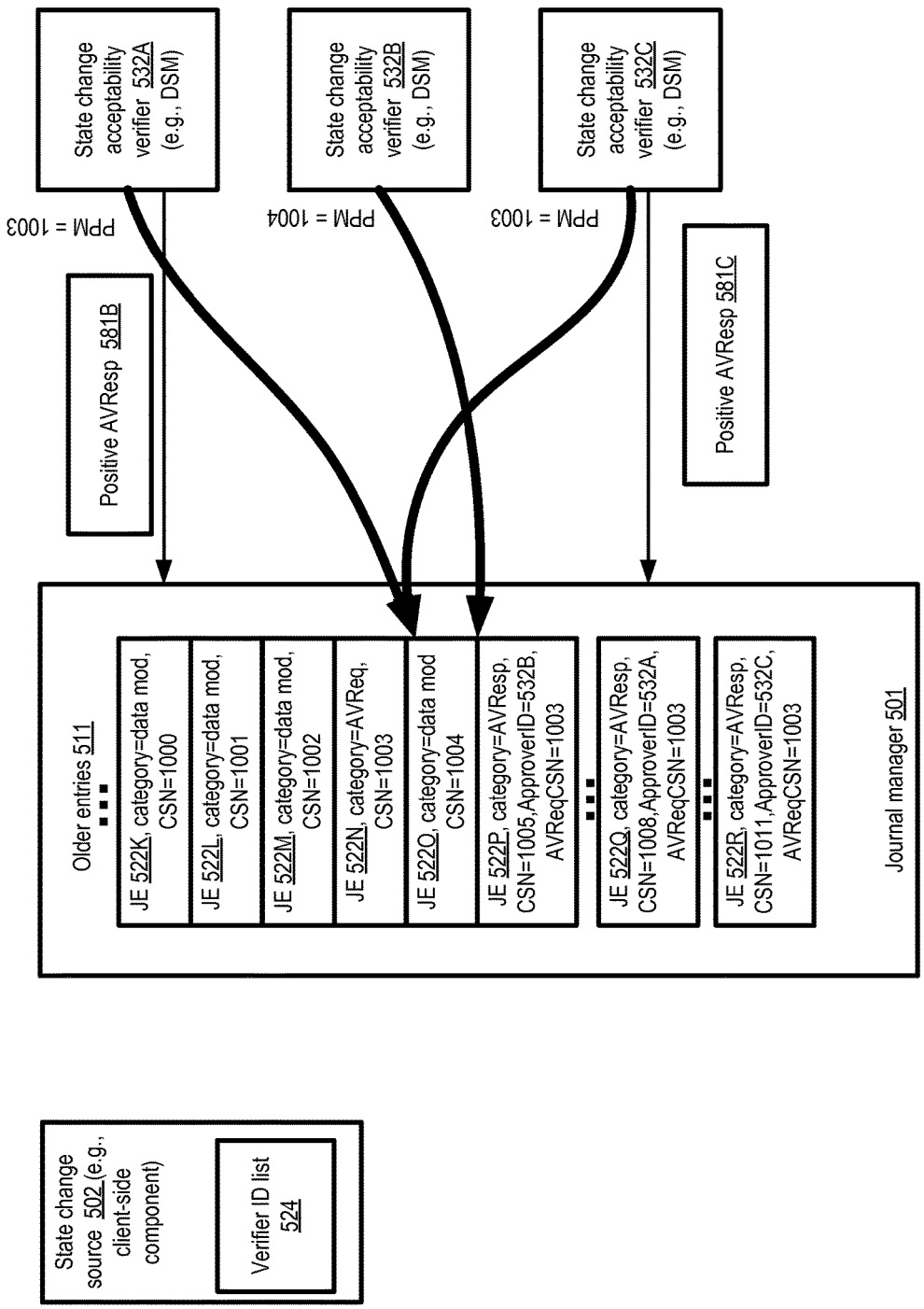

The other two acceptability verifiers 532A and 532C may eventually reach AVReq entry 522N, as indicated by their PPM values of 1003 shown in FIG. 9. Verifiers 532A and 532C may also advance their PPMs before completing the acceptability testing. If the testing succeeds, respective positive AVResp messages 581B and 581C may be sent from verifiers 532A and 532C to the journal manager. The journal manager may append corresponding AVResp entries 522Q and 522R, with CSNs 1008 and 1011 respectively, to the journal.

Figure 10:
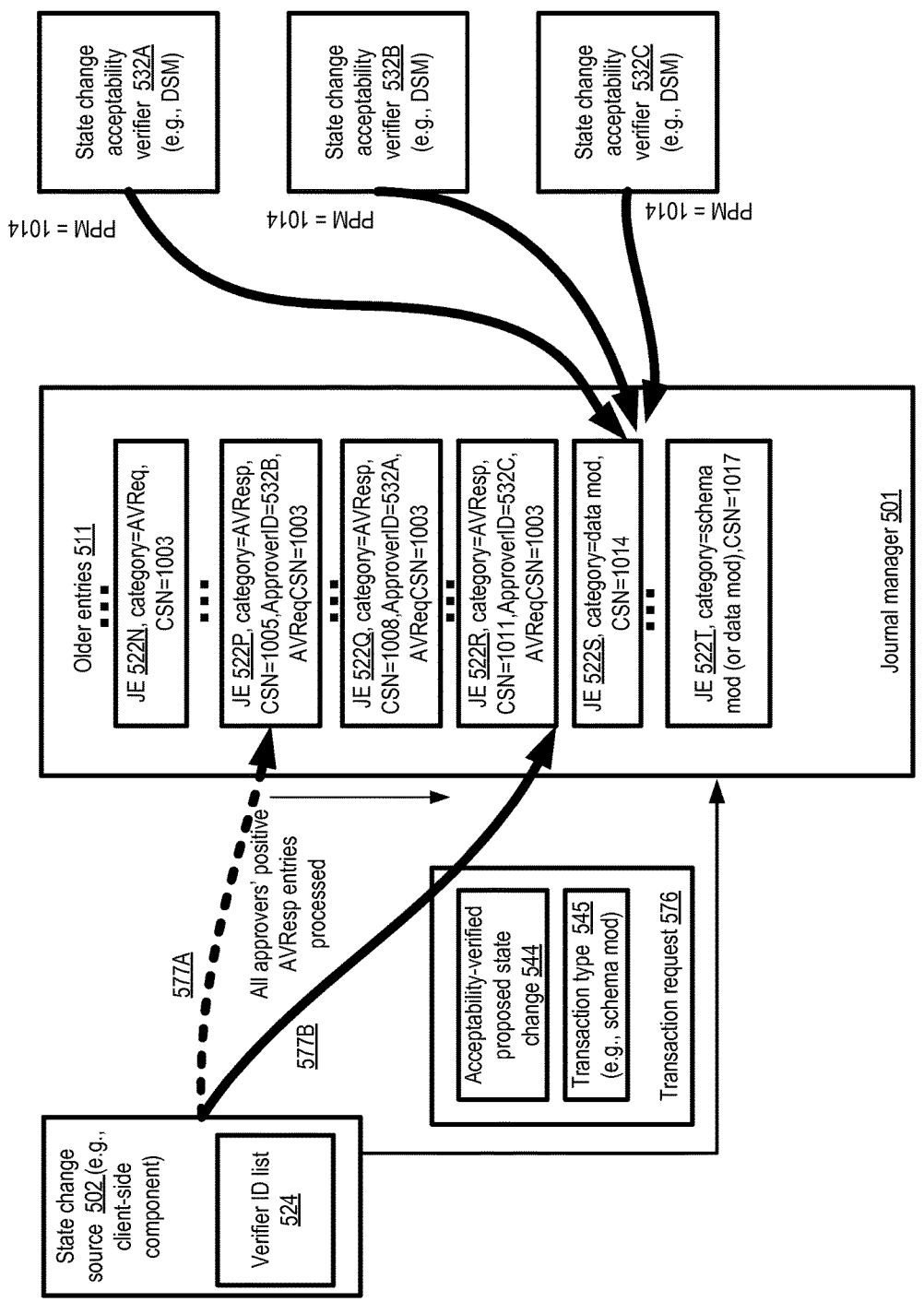
Figure 11:
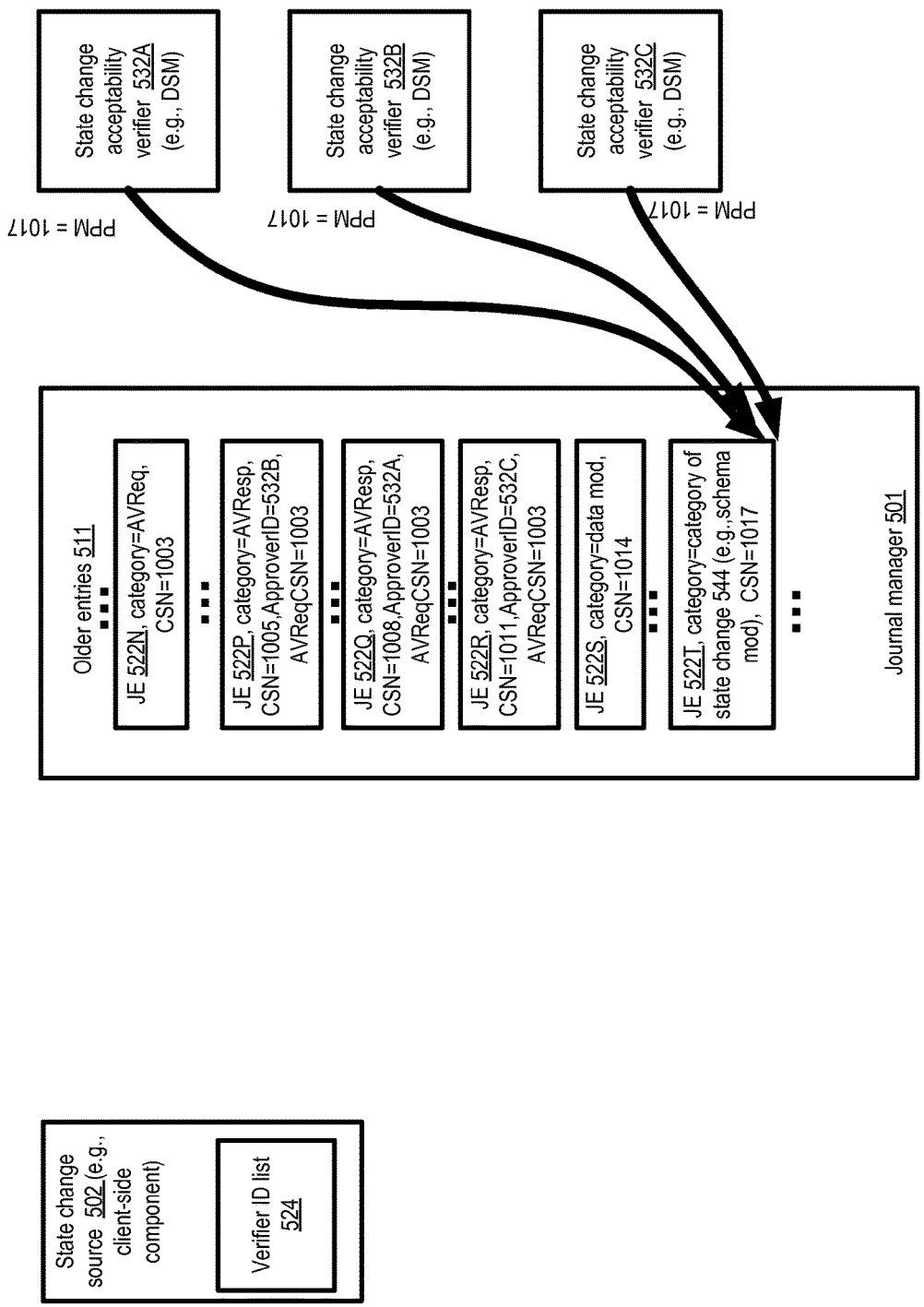

Meanwhile, after receiving the acknowledgement 571 of the submitted AVReq 561, the state change source may start examining the entries of the journal appended after the AVReq entry 522N to check whether enough positive AVResp entries have been added to the journal. In some implementations, the state change source 502 may keep a cursor at the head of the journal, examining each new entry as it is added, to determine whether the new entry is an AVResp entry corresponding to AVReq entry 521. At the point of time illustrated in FIG. 10, positive responses from all the approvers in verifier ID list 524 have been found in its search, as indicated by the arrows 577A and 577B. Accordingly, the state change source may submit a transaction request 576 indicating the now acceptability-verified state change 544 and the transaction type (e.g., schema mod for journal schema changes, or data mod if the state change modifies a data object). After performing commit analysis (e.g., including read-write conflict detection) on transaction request 576, the journal manager may determine that the state change is committable in the scenario illustrated in FIG. 10. Accordingly, a journal entry 522T with a sequence number 1017 may be added to the journal, indicating that the state change that was previously checked for acceptability has now been officially approved. In FIG. 10, the PPMs of the three acceptability verifiers have all reached 1014, indicating that journal entries up to 522S have been processed. In various embodiments, when an acceptability verifier 532 encounters an AVResp entry, it may not perform any operations other than advancing the PPM—i.e., no work may be required from the acceptability verifiers with respect to AVResp entries in such embodiments. In FIG. 11, the PPMs of the three acceptability verifiers have reached the CSN 1017 of the committed transaction entry representing state change 544. Accordingly, state change 544 may be materialized at one or more of the acceptability verifiers—e.g., a local version of the journal schema may be modified at each of the acceptability verifiers, or a data object affected by the state change may be modified. It is noted that although the acceptability verification protocol illustrated in FIG. 5-FIG. 11 may be used for any type of state change in various embodiments, it may be used primarily or only for important state changes (such as journal schema changes) in at least some embodiments.

Example Transaction Request Elements

Figure 12:
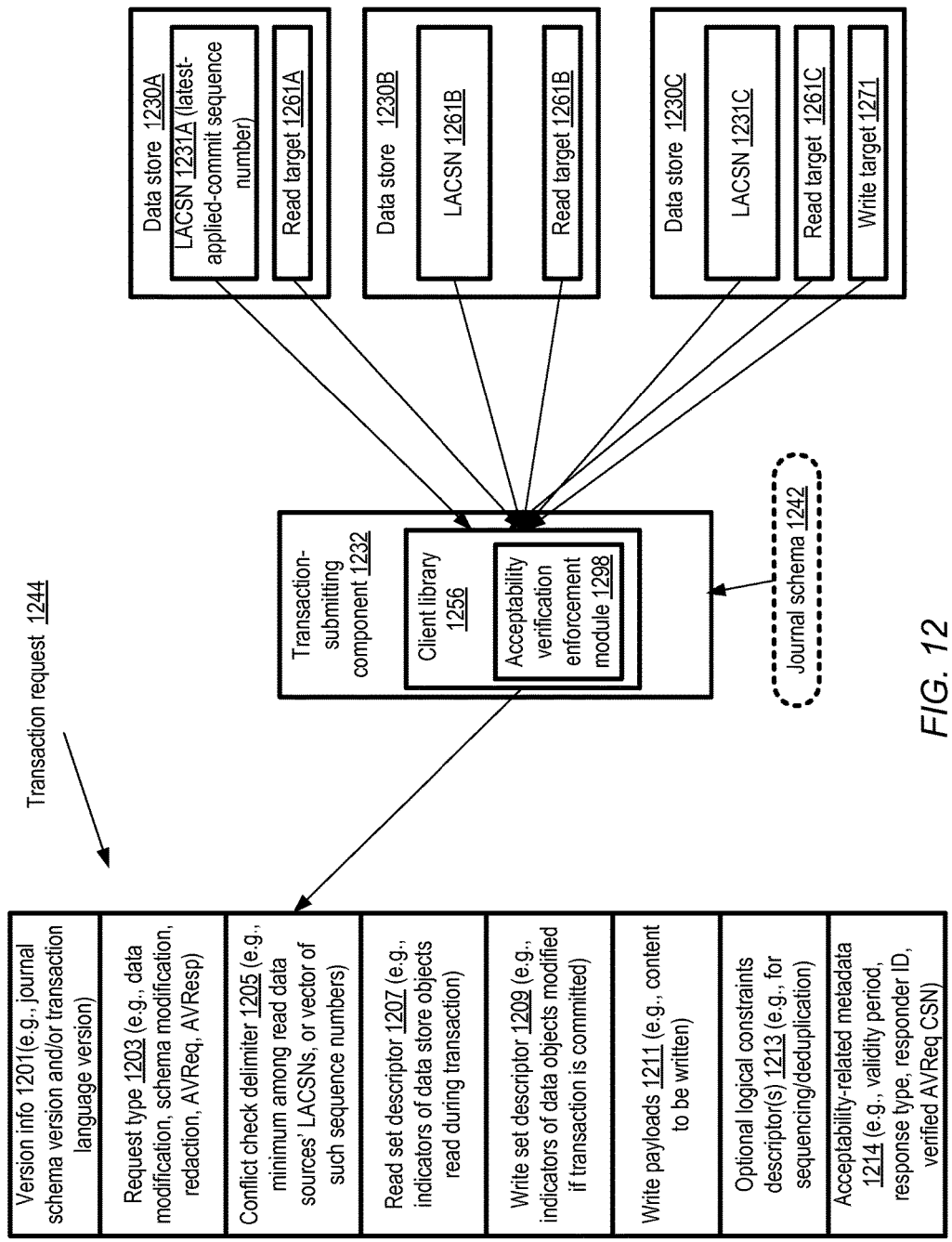
FIG. 12 illustrates an overview of transaction requests which may be submitted to a journal manager of a multi-data-store storage system, according to at least some embodiments.

FIG. 12 illustrates an overview of transaction requests which may be submitted to a journal manager of a multi-data-store storage system, according to at least some embodiments. Generally speaking, transaction requests may be transmitted by client-side components and/or by data store managers in various embodiments. As shown, transaction request 1244 may include some combination of versioning information 1201, a transaction type indicator 1203, a conflict check delimiter 1205, a read set descriptor 1207, a write set descriptor 1209, write payload(s) 1211, optional logical constraint descriptors 1213 and/or acceptability-related elements 1214 in the depicted embodiment. Some of the elements may be required only for a subset of transaction types—for example, acceptability-related elements 1214 may not be required for data-modifying, schema-modifying or redaction transactions. In at least one embodiment, an acceptability verification request transaction may include some or all of the elements required for the data-modifying or schema-modifying transaction (such as a read set descriptor, a write set descriptor, and/or a write payload) whose acceptability is to be verified.

In the depicted embodiment, a transaction-submitting component 1232 may comprise a client library 1256 which may be utilized to assemble or prepare the transaction request. In at least some embodiments, the client library may automatically record information about the read targets 1261A, 1261B, and 1261C (e.g., corresponding to respective data objects whose attribute details are specified in the journal schema 1242) respectively within data stores 1230A, 1230B and 1230C from which data is read during the transaction. In some embodiments, the read set descriptors may be generated by applying transformation functions (e.g., hash functions) to the read queries. In various embodiments, information about the write target 1271 (of data store 1230C in the depicted example) to which data is written may also be recorded by the client library 1256, e.g., by applying similar transformation functions to queries whose results may be affected by the writes. In some implementations, the client library 1256 may also obtain, from each of the data stores 1230, a corresponding latest-applied commit sequence number (LACSN) 1231 (e.g., 1231A-1231C) of the most recent transaction whose writes have been applied at the data store. In one embodiment, such LACSNs 1231 may be retrieved before any of the reads of the transaction are issued to the corresponding data stores, for example. In another embodiment, the LACSNs 1231 may be retrieved from a given data store 1230 just before the first read that is directed to that data store within the current transaction is issued. In some embodiments, the client library 1256 may include an acceptability verification enforcement module 1298. Module 1298 may check, before a certain type of transaction request (such as a journal schema modifying transaction) is transmitted to the journal manager, that the acceptability of the change(s) indicated in the transaction has been verified using the protocol described above.

In the depicted embodiment, the version number of the journal schema 1242 and/or the version number of the data-store independent transaction language being used for the transaction request 1244 may be indicated in version information fields 1201. In some embodiments, the transaction category (e.g., data object modification, journal schema modification, redaction, acceptability verification request, acceptability verification response, etc.) may be indicated in a separate request type field 1203. In other embodiments, the request type may be implicit rather than explicit, e.g., the type of state change being requested may be apparent based on the write set descriptor and/or other elements of transaction request 1244. The conflict check delimiter 1205 may be derived from a function to which the LACSNs 1231 are provided as input in some embodiments. For example, in one implementation, the minimum sequence number among the LACSNs obtained from all the data stores read during the transaction may be used. In another implementation, a vector or array comprising the LACSNs from each of the data stores may be included as the conflict check delimiter 1205 of the transaction request descriptor. The conflict check delimiter 1205 may also be referred to herein as a committed state identifier, as it represents a committed state of one or more data stores upon which the requested transaction depends.

As mentioned earlier, in some embodiments, transformation functions may be applied to read queries to generate the read set descriptor 1207, and/or similar transformation functions may be applied to write-affected queries (a set of queries whose results may be affected by the proposed writes) to generate write set descriptor 1209 in various embodiments. In some embodiments, instead of the query-based transformation, a selected transformation function may instead be applied to the locations/addresses of the read targets to obtain a set of hash values to be included in read descriptor 1207. Similarly, a selected transformation function (either the same function as was used for the read descriptor, or a different function, depending on the implementation) may be applied to the location of the write(s) of a transaction to generate the write set descriptor 1209 in some embodiments. In another embodiment in which read set descriptors and/or write set descriptors are generated based on locations rather than query contents, hashing may not be used; instead, for example, an un-hashed location identifier may be used for each of the read and write set entries. The write payload 1211 may include a representation of the data that is to be written for each of the writes included in the transaction. Optional logical constraints 1213 may include signatures used for duplicate detection/elimination and/or for sequencing specified transactions before or after other transactions in some embodiments. Some or all of the contents of the transaction request descriptor 1244 may be stored as part of the journal entries (e.g., committed transaction records) in some embodiments.

Acceptability-related elements 1214 may include, for example, a validity period for an acceptability verification request, and/or (in the case of an acceptability verification response) an identifier of the responding verifier, a sequence number indicating the particular request to which the response corresponds, and the response type (e.g., positive or negative).

It is noted that the read and write targets from which the read set descriptors and/or write set descriptors are generated may represent different storage granularities, or even different types of logical entities, in different embodiments or for different data stores. For example, for a data store comprising a non-relational database in which a particular data object is represented by a combination of container name (e.g., a table name), a user name (indicating the container's owner), and some set of keys (e.g., a hash key and a range key), a read set may be obtained as a function of the tuple (container-ID, user-ID, hash key, range key). For a relational database, a tuple (table-ID, user-ID, row-ID) or (table-ID, user-ID) may be used. In various embodiments, the journal manager may be responsible, using the contents of a transaction request and the journal, for identifying conflicts between the reads indicated in the transaction request and the committed writes indicated in the journal.

Conflict Detection Overview

Figure 13:
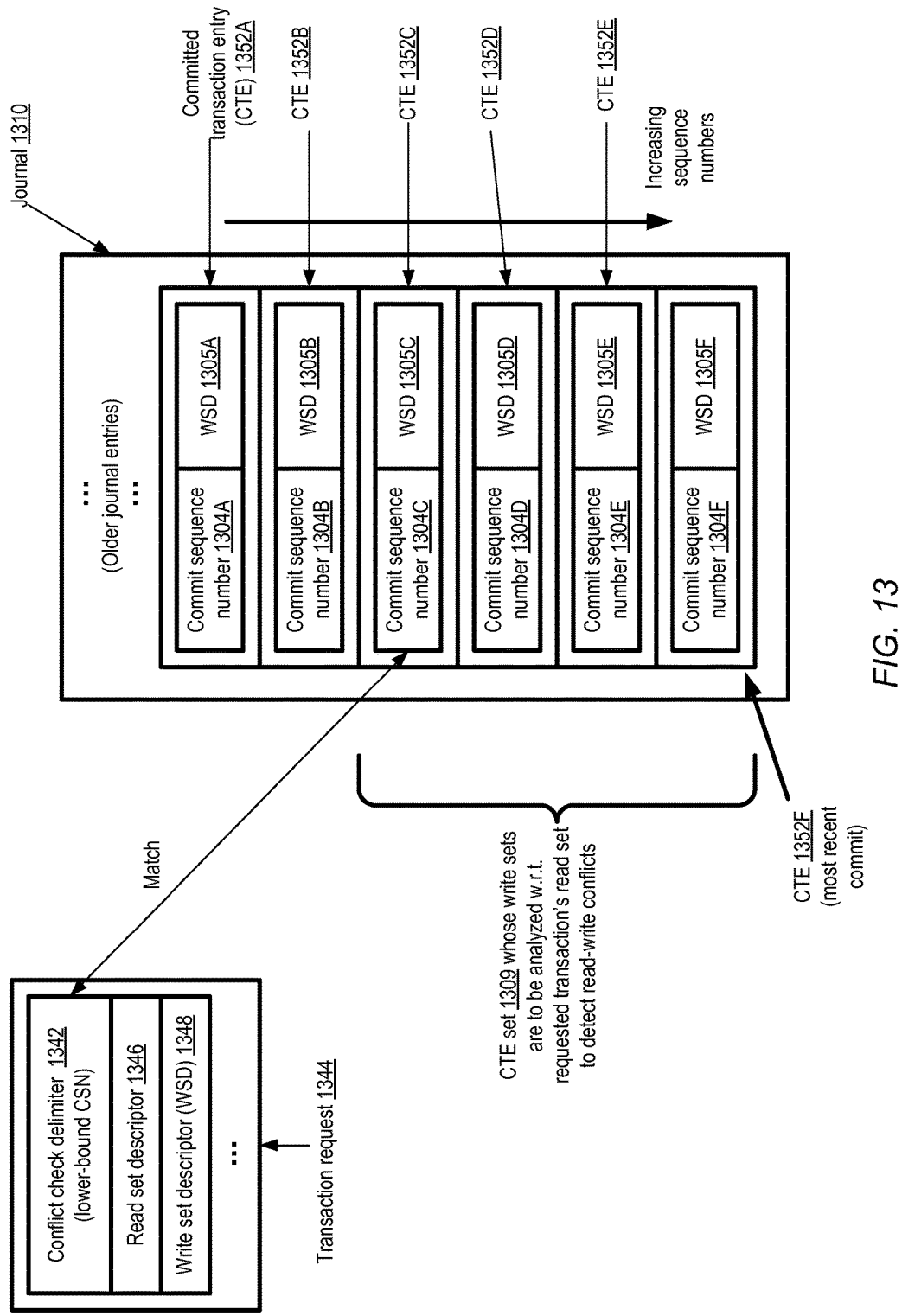
FIG. 13 illustrates an overview of conflict detection operations which may be performed by a journal manager, according to at least some embodiments.

FIG. 13 illustrates an overview of conflict detection operations which may be performed by a journal manager, according to at least some embodiments. Such operations may be performed for a subset of the transaction categories supported in various embodiments, such as data object modification transactions and/or journal schema modification transactions, and may not be required for other transaction categories such as acceptability verification requests/responses or redactions. In the depicted example, committed transaction entries (CTEs) 1352 stored at journal 1310 are shown arranged in order of increasing commit sequence numbers from the top to the bottom of the figure. The latest or most recently committed transaction is represented by CTE 1352F, with commit sequence number (CSN) 1304F and write set descriptor (WSD) 1305F. Each of CTEs 1352A, 1352B, 1352C, 1352D and 1352E comprises a corresponding CSN 1304 (e.g., CSNs 1304A-1304E respectively) and a corresponding WSD 1305 (e.g., WSDs 1305A-1305E).

As shown, transaction request 1344 includes a conflict check delimiter (or committed state identifier) 1342, a read set descriptor 1346 and a write set descriptor 1348. (The write payload and other elements of the requested transaction are not shown). The conflict detector of the journal manager may be required to identify a set of CTEs of journal 1310 that are to be checked for conflicts with the read set of the requested transaction. The conflict check delimiter 1342 indicates a lower-bound CSN that may be used by the conflict detector to identify the starting CTE of set 1309 to be examined for read-write conflicts with the requested transaction in the depicted embodiment, as indicated by the arrow labeled "Match". Set 1309 may include all the CTEs starting with the matching sequence number up to the most recent committed transaction (CTE 1352F) in some embodiments. If any of the writes indicated by the CTE set 1309 overlap with any of the reads indicated in the transaction request 1344, such a read-write conflict may lead to a rejection of the requested transaction. A variety of mechanisms may be used to check whether such an overlap exists in different embodiments. In one embodiment, for example, one or more hashing-based computations or probes may be used to determine whether a read represented in the read set descriptor 1346 conflicts with a write indicated in the CTE set 1309, thereby avoiding a sequential scan of the CTE set. In some implementations, a sequential scan of CTE set 1309 may be used, e.g., if the number of records in the CTE set is below a threshold. If none of the writes indicated in CTE set 1309 overlap with any of the reads of the requested transaction, the transaction may be accepted, since none of the data that were read during the preparation of the transaction request can have changed since they were read. In at least one embodiment, a transaction request may also indicate an upper bound on the sequence numbers of journal entries to be checked for conflicts—e.g., the conflict check delimiter may indicate both a starting point and an ending point within the set of CTEs 1352.

Journal Implementation Using Replication DAGs

Figure 14:
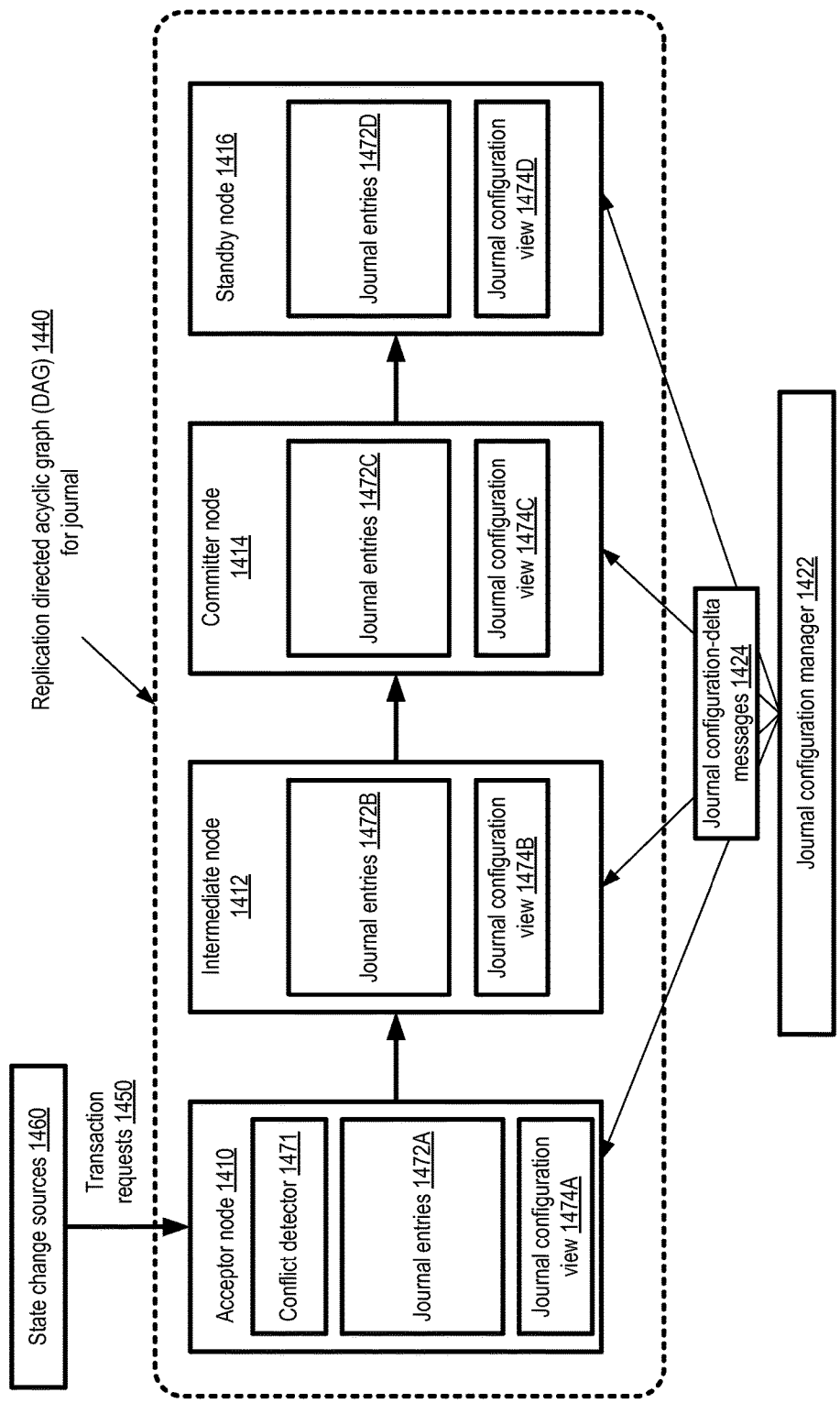
FIG. 14 illustrates an example replication directed acyclic graph (DAG) which may be used to implement a journal of a multi-data-store storage system, according to at least some embodiments.

In some embodiments, the journal of a multi-data-store storage system may be replicated for enhanced data durability and/or higher levels of availability. FIG. 14 illustrates an example replication directed acyclic graph (DAG) which may be used to implement a journal of a multi-data-store storage system, according to at least some embodiments. In general, a replication DAG 1440 may include one or more acceptor nodes 1410 to which transaction requests 1450 may be submitted by state change sources 1460 (such as client-side components or data store managers), one or more committer nodes 1414, zero or more intermediary nodes 1412 each positioned along a replication pathway comprising DAG edges leading from an acceptor node to a committer node, and zero or more standby nodes 1416 that are configured to quickly take over responsibilities of one of the other types of nodes in the event of a node failure. In the embodiment depicted in FIG. 14, the acceptor node includes a conflict detector 1471 of the journal manager. In other embodiments, instead of being incorporated within an acceptor node, the conflict detector may be implemented separately.

In at least some embodiments, each node of a particular replication DAG such as 1440 may be responsible for replicating journal entries. The journal entries may be propagated along a set of edges from an acceptor node to a committer node of the DAG along a replication pathway. In FIG. 14, the current replication pathway starts at acceptor node 1410, and ends at committer node 1414 via intermediary node 1412. For a given journal entry (e.g., an entry indicating a committed data object modification, a committed journal schema change, an acceptability verification request or response, or a redaction entry), one replica may be stored at each of the nodes along the replication path, e.g., in journal entries 1472A, 1472B and 1472C. Each journal entry propagated within the DAG may include a respective sequence number or a logical timestamp that is indicative of an order in which the corresponding transaction request was processed (e.g., at the acceptor node 1410). When a particular journal entry reaches a committer node, e.g., after a sufficient number of replicas of the entry have been saved along the replication pathway, the corresponding transaction may be explicitly or implicitly committed. If for some reason a sufficient number of replicas cannot be created, the journal entries may be logically and/or physically removed (e.g., by setting a "removed" flag) in some embodiments from the nodes (if any) at which they have been replicated thus far. After a commit, the writes of a transaction (if any writes were part of the transaction) may be propagated or applied to a set of destinations (such as storage devices at which the contents of the member data stores are located) as described earlier, e.g. by respective write appliers. In some implementations, only a subset of the DAG nodes may be read in order to propagate committed writes to their destinations. In other embodiments, journal entries may be read from any of the DAG nodes to propagate the changes. In at least one embodiment, write appliers or cursors may be implemented as respective threads or processes that may run at the same hosts at one or more of the DAG nodes. In other embodiments, write appliers may run on different hosts than the DAG nodes. A journal entry may also be transmitted eventually to standby node 1416, and a replica of it may be stored there after it has been committed, so that the standby node 1416 is able to replace a failed node of the DAG quickly if and when such a failover becomes necessary.

A journal configuration manager 1422 may be responsible for managing changes to DAG configuration (e.g., when nodes leave the DAG due to failures, or join/re-join the DAG) by propagating configuration-delta messages 1424 asynchronously to the DAG nodes in the depicted embodiment. Each configuration-delta message may indicate one or more changes to the DAG configuration that have been accepted or committed at the journal configuration manager 1422. In some embodiments, each replication node may implement a respective deterministic finite state machine, and the journal configuration manager may implement another deterministic finite state machine.

The protocol used for managing DAG configuration changes may be designed to maximize the availability or "liveness" of the DAG in various embodiments. For example, the DAG nodes may not need to synchronize their views of the DAG's configuration in at least some embodiments; thus, the protocol used for transition record propagation may work correctly even if some of the nodes along a replication pathway have a different view of the current configuration of the journal DAG than other nodes. In FIG. 14, each of the nodes may update its respective journal configuration view 1474 (e.g., 1474A, 1474B, 1474C or 1474D) based on the particular sequence of configuration-delta messages it has received from the configuration manager 1422. It may thus be the case, in one simple example scenario, that one node A of a DAG 1440 continues to perform its state transition processing responsibilities under the assumption that the DAG consists of nodes A, B, C and D in that order (i.e., with a replication pathway A-to-B-to-C-to-D), while another node D has already been informed as a result of a configuration-delta message that node C has left the DAG, and has therefore updated D's view of the DAG as comprising a changed pathway A-to-B-to-D. The configuration manager may not need to request the DAG nodes to pause processing of transactions and corresponding journal entries in at least some embodiments, despite the potentially divergent views of the nodes regarding the current DAG configuration. Thus, the types of "stop-the-world" configuration synchronization periods that may be required in some state replication techniques may not be needed when using replication DAGs of the kind described herein to implement persistent journals for distributed transaction management. Although a linear replication pathway is shown in FIG. 14, in general, a replication pathway may include branches at least at some points of time (e.g., during periods when some DAG nodes have received different configuration delta messages than others). Under most operating conditions, the techniques used for propagating DAG configuration change information may eventually result in a converged consistent view of the DAG's configuration at the various member nodes, while minimizing or eliminating any downtime associated with node failures/exits, node joins or node role changes. It is noted that in some embodiments, journal entries may be stored without using the kinds of replication DAGs illustrated in FIG. 14.

In at least some embodiments, the nodes of a replication DAG may each be implemented as a respective process or thread running at a respective host or hardware server. The hosts themselves may be physically dispersed, e.g., within various data centers of a provider network. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. Provider networks may also be referred to as "public cloud" environments. Some or all of the data stores for which transaction support is provided using the techniques described herein may be established using network-accessible database services and/or other storage services of a provider network in some embodiments. In one embodiment, a provider network at which journal-based transactions are implemented may be organized into a plurality of geographical regions, and each region may include one or more availability containers, which may also be termed "availability zones" herein. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. In some such embodiments, one or more nodes of a replication DAG 1440 may be implemented at a different availability container than other nodes of the replication DAG, thereby increasing the robustness and durability of the journal.

Methods for Implementing an Acceptability Verification Protocol

Figure 15:
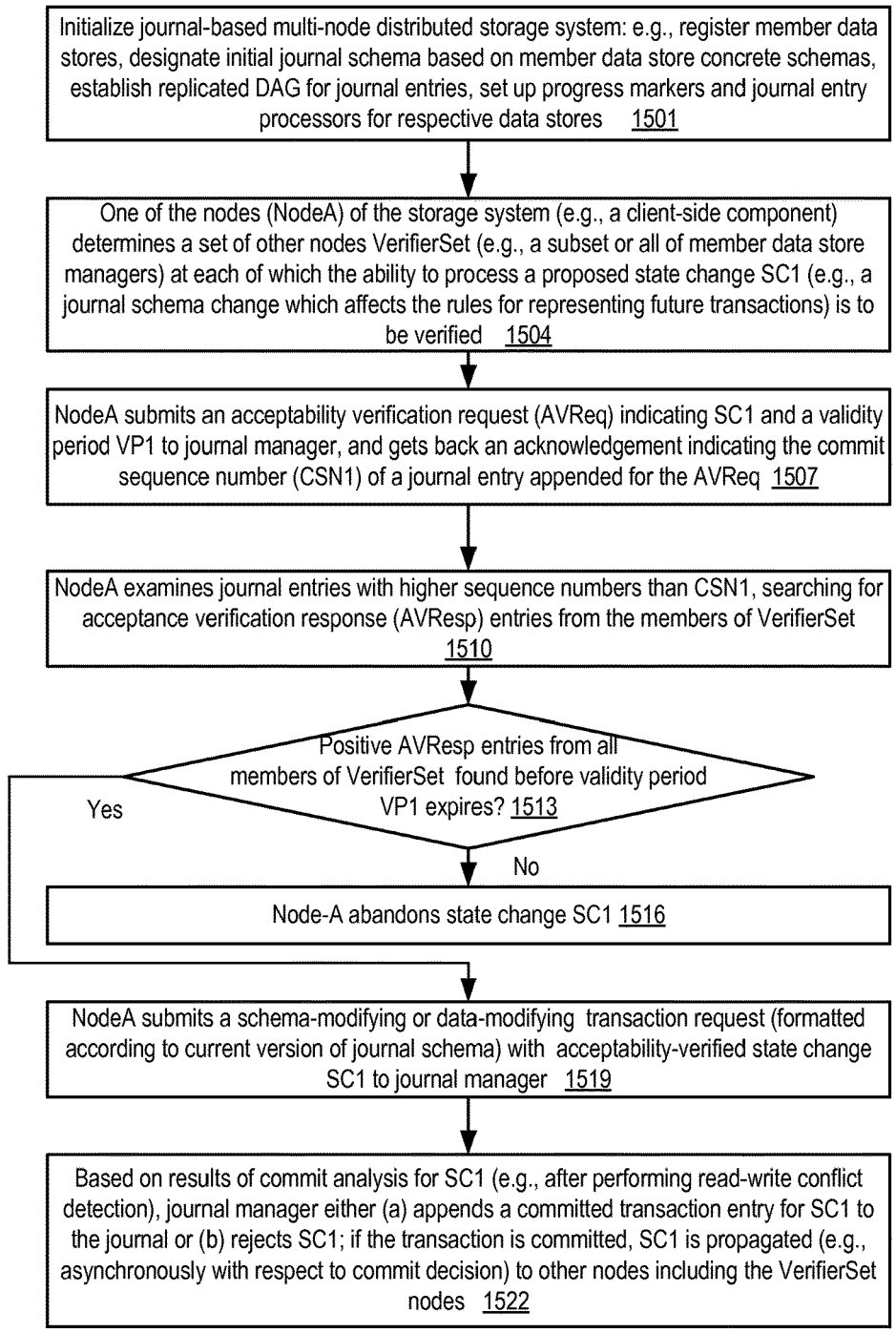
FIG. 15 is a flow diagram illustrating aspects of operations that may be performed by a node of a distributed storage system to request and confirm acceptability verification of a state change, according to at least some embodiments.

FIG. 15 is a flow diagram illustrating aspects of operations that may be performed by a node of a distributed storage system to request and confirm acceptability verification of a state change, according to at least some embodiments. The storage system may be initialized (element 1501), for example, by registering the member data stores, designating an initial version of a journal schema, establishing a replicated DAG for the journal entries, instantiating a journal manager, and setting up journal entry processors (such as write appliers), initializing processing progress markers (PPMs) and the like. Each of the member data stores may have a respective concrete schema specifying characteristics of the data objects on which transactions are to be managed using the journal, and the journal schema may be based at least in part on the various concrete schemas of the members. The set or range of values allowed for various data object attributes in the journal schema may be selected to maximize the overlap between the value ranges permitted by the concrete schemas. In addition to the data object definitions, the journal schema may also include or reference a specification of a data-store-independent transaction language to be used to submit transactions of various categories, e.g., data object modification transactions, journal schema modification transactions, redaction transactions, and the like.

After the storage system has been initialized, proposed changes to the state of the system may be transmitted (e.g., from client-side components) to the journal manager, e.g., in the form of transaction requests formatted in the transaction language indicated in the current version of the journal schema. In at least some embodiments, a client-side component may obtain the current version of the journal schema from the journal manager, while in other embodiments the client-side component may obtain the journal schema from a member data store. For certain types of state changes, such as changes to the journal schema which may affect the rules used for representing future transactions, an acceptability verification protocol may be invoked. A particular node (NodeA, such as a client-side component) of the system may determine or identify a set of other nodes (VerifierSet) from which feedback with respect to the feasibility of a particular potential state change SC1 is desired (element 1504). For example, with respect to a possible state change to a journal schema, the state change source NodeA may wish to confirm that each member of VerifierSet (such as some distinguished subset or all of the data store managers of the system) will be able to complete processing/applying SC1 without encountering an error condition.

NodeA may submit an acceptability verification request (AVReq) indicating the potential state change SC1 and a validity period VP1 to the journal manager (element 1507). AVReq, like other transaction requests, may be formatted in accordance with the current version of the journal schema which is in effect (even if AVReq indicates a potential change to the journal schema which could take effect after its acceptability is verified). The journal manager may append an entry representing AVReq to the journal, and provide the commit sequence number CSN1 of that entry to NodeA.

NodeA may then begin examining the journal (e.g., the subset of the journal with CSNs higher than CSN1) to find responses to its AVReq (element 1510). In some embodiments, NodeA may maintain a look-ahead cursor into the journal, positioned at or near the head of the journal, which examines each new journal entry as it is appended. As and when positive responses to NodeA's AVReq are found in the journal, NodeA may check of the node of the VerifierSet from which the positive response is received. If NodeA is able to determine, prior to the expiration of the validity period VP1, that all the targeted members of VerifierSet have submitted positive responses to the AVReq (element 1513), NodeA may submit a schema-modifying or data-modifying transaction request indicating SC1 to the journal manager (element 1519). If at least one negative response to its AVReq is found in the journal, or if the validity period expires before all the targeted positive responses have been identified in the journal (as also detected in element 1513), NodeA may abandon further pursuit of state change SC1 (element 1519). In at least one embodiment, if a response (either positive or negative) to the AVReq is received from an unexpected source (e.g., from an entity which is not a member of VerifierSet), this may be treated as equivalent to a negative response from a member of VerifierSet, and state change SC1 may be abandoned. In other embodiments, NodeA may simply ignore such unexpected responses. In some embodiments, a different approach may be taken if the validity period expires before sufficient positive responses are detected, than if a negative response is detected. For example, if no negative response has been received before the validity period expires, NodeA may re-submit the acceptability verification request in such an embodiment, in effect extending the validity period of the previous request, and may resume examining the journal entries for positive responses.

In the scenario in which the required positive responses are found in the journal and a schema-modifying or data-modifying transaction indicating SC1 as the proposed state change is submitted by NodeA, the journal manager may perform commit analysis (e.g., including read-write conflict detection based on the read set of the modifying transaction and the write sets of a subset of other entries in the journal) (element 1522). If the transaction is found acceptable, a commit entry indicating SC1 may be appended to the journal, and the writes corresponding to SC1 may be propagated to one or more other nodes (including some or all members of VerifierSet) either synchronously or asynchronously with respect to the commit decision. In at least one embodiment, the writes of SC1 may be propagated to at least one node which was not a member of VerifierSet. If the commit analysis indicates that the transaction cannot be accepted for commit, it may be rejected.

Figure 16:
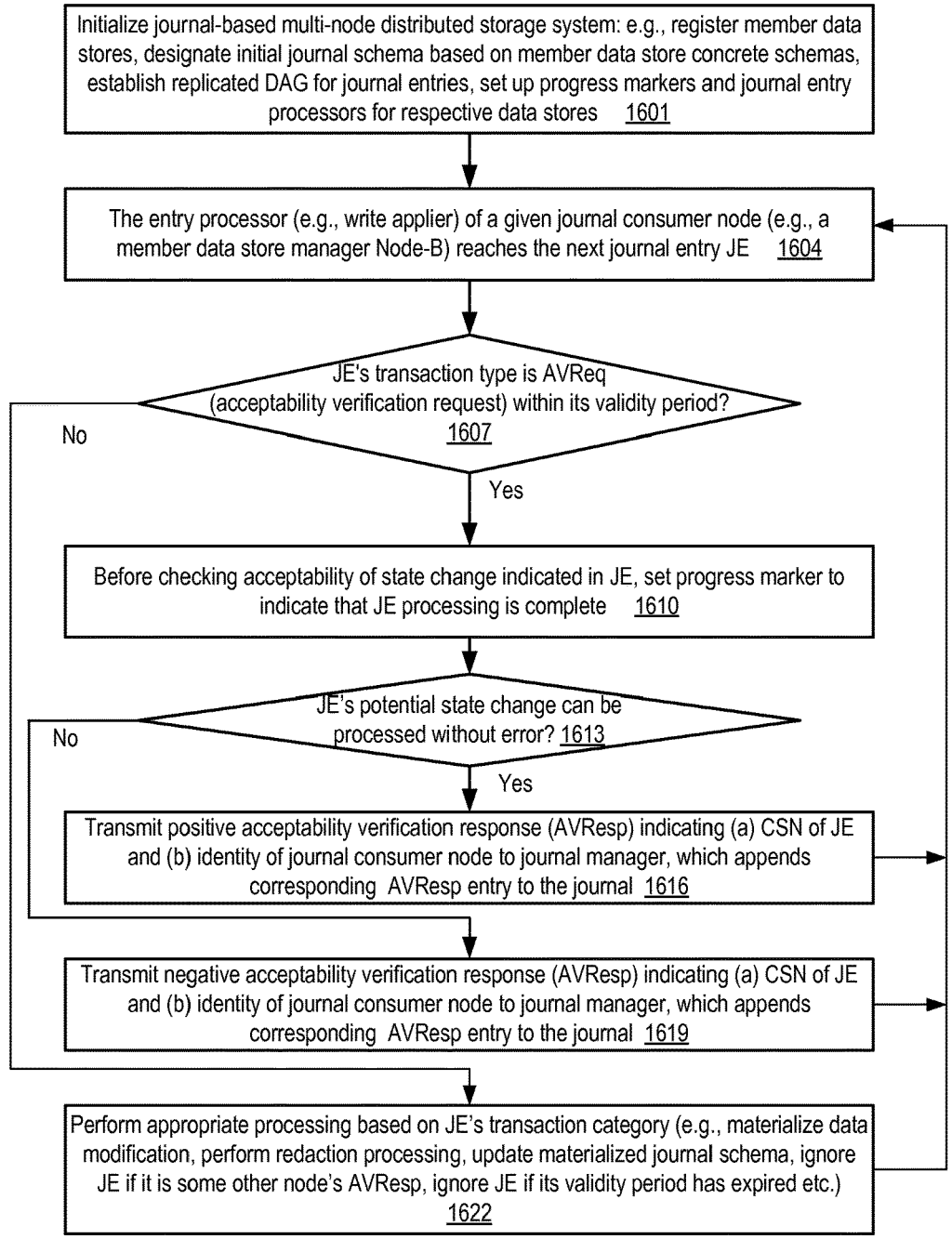
FIG. 16 is a flow diagram illustrating aspects of operations that may be performed by a node of a distributed storage system to respond to an acceptability verification request for a state change, according to at least some embodiments.

FIG. 16 is a flow diagram illustrating aspects of operations that may be performed by a node of a distributed storage system to respond to an acceptability verification request for a state change, according to at least some embodiments. As shown in element 1601, operations similar to those discussed with respect to element 1501 of FIG. 15 may be performed to initialize the distributed storage system. These operations may include, for example, registering the member data stores, designating an initial version of a journal schema, establishing a replicated DAG for the journal entries, instantiating a journal manager, and setting up journal entry processors (such as write appliers), initializing processing progress markers (PPMs) and the like. After the storage system has been initialized, the journal entry processors of various consumers of the journal entries may begin examining the journal entries in order of commit sequence numbers.

During the course of its sequential examination of the journal, a journal entry processor of a particular consumer node NodeB of the journal (such as a data store manager which materializes at least some subset of the data objects managed using the journal) may encounter a particular next journal entry (JE) (element 1604) and determine the category of JE. If JE represents an acceptability verification request (AVReq) (as determined in element 1607) whose validity period has not yet expired, in at least some embodiments the progress marker of NodeB may be set to indicate that JE has already been processed (e.g., before the acceptability-checking related operations associated with JE have been begun, or before the acceptability-checking related operations are complete) (element 1610). As discussed earlier, such proactive advancing of the progress marker may help avoid error scenarios in which a given state change whose acceptability check fails leads to a restart of NodeB, followed by a repeated attempt to perform the acceptability check based on the current progress marker indication. If the progress marker value doesn't change when NodeB comes back online after a restart, a loop of failed acceptability checks and restarts may result. It is noted that in some embodiments, such advancing of the progress marker may not be performed.

NodeB may determine whether the potential state change indicated in JE can be processed at NodeB without errors, without actually implementing or applying the state change. Such checking may, for example, involve whether the proposed state change of JE is compatible with the concrete schema of NodeB (and/or with the current version of the journal schema known to NodeB). If JE's state change can be processed successfully, NodeB may transmit a positive acceptability verification response (AVResp) message to the journal manager (element 1616); otherwise, a negative response may be sent (element 1619). The response may include, for example, an indication of the identity of NodeB (which may enable the submitter of JE to check off NodeB in its list of expected responders to JE), as well as a CSN (or some other identifier) of JE, the request to which the response is being provided. The journal manager may, in response to receiving the request, store a corresponding AVResp entry in the journal, which can be read by JE's submitter.

If JE is not an acceptability verification request entry with an un-expired validity period (as also determined in operations corresponding to element 1607), NodeB may perform the appropriate other operations depending on the transaction type (element 1622). In some cases, as when JE is an AVResp entry from some other node, or if JE is an AVReq entry with an expired validity period, NodeB may simply advance its progress marker without performing any additional processing with respect to JE itself, in effect ignoring much of the content of JE. If JE contains an indication of a write to be materialized at NodeB, the appropriate data object or journal schema targeted by the write may be updated. If JE is a redaction entry, NodeB may perform the appropriate redaction processing (e.g., by abandoning, or marking as abandoned, the processing of a redaction target entry indicated by JE, and so on. The progress marker may be advanced to the next entry after the processing or analysis indicated in element 1622, and NodeB may examine the next entry (if any exists) in the journal, repeating the operations of elements 1604 onwards.

It is noted that in various embodiments, some of the operations shown in the flow diagrams of FIG. 15 and FIG. 16 may be implemented in a different order than that shown in the figure, or may be performed in parallel rather than sequentially. Additionally, some of the operations shown in one or more of the flow diagrams may not be required in one or more implementations.

Use Cases

The techniques described above, of using a proactive acceptability verification protocol for managing important state changes at a multi-data-store storage system or database whose state changes are represented as respective journal entries may be useful in a variety of environments. Some state changes, if applied only partially or without careful checking, can have significant negative impacts on such storage systems. For example, if the state change modifies the data-store-independent transaction language that is to be used for future transaction requests, and some member data stores are incapable of handling the new version of the language while other member data stores are capable of handling the new version, this can easily lead to inconsistences from which recovery may be non-trivial. If the acceptability verification technique described herein is used prior to actually applying such a state change, such problematic scenarios may be avoided. Furthermore, by using the journal as the vehicle by which pre-approvals of potential state changes are obtained, the protocol may be implemented without requiring direct message traffic between the proposer of the state change and the set of entities which are to verify its acceptability. In distributed systems in which messages can sometimes get delayed or lost, the use of the persistent journal may considerably simplify the acceptability verification procedure.

Illustrative Computer System

Figure 17:
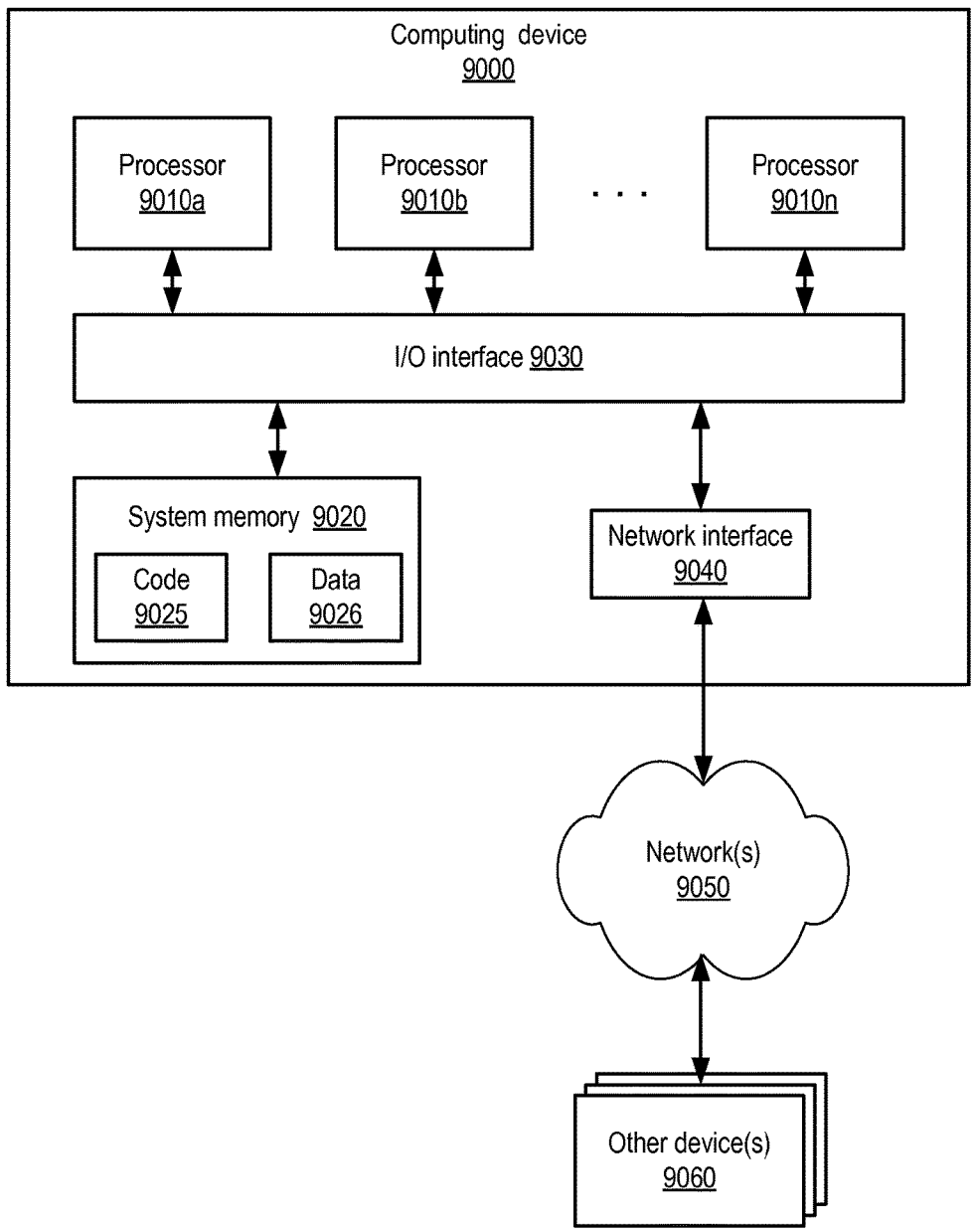
FIG. 17 is a block diagram illustrating an example computing device that may be used in at least some embodiments.

In at least some embodiments, a server that implements one or more of the techniques described above for transaction management and acceptability verification at a journal-based multi-data-store storage system (including for example the operations of journal managers, data store managers, client-side components, write appliers or processing progress markers) may include a general-purpose computer system that includes or is configured to access one or more computer-accessible media. FIG. 17 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 16, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 16 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 17 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
    appending, to a journal of a multi-data-store database by a journal manager implemented at one or more computing devices, a first acceptability verification request entry, wherein the first acceptability verification request entry indicates one or more potential state changes of the multi-data-store database submitted to the journal manager by a client-side component, wherein the journal includes one or more committed transaction entries indicating respective approved state changes of the multi-data-store database, and wherein the multi-data-store database comprises a plurality of data stores, including a first data store with a first data store manager implemented at one or more computing devices;
    determining, by the first data store manager, based at least in part on examining contents of the first acceptability verification request obtained from the journal, and without applying the one or more potential state changes at the first data store, that the one or more potential state changes meet an acceptance criterion associated with processing state changes at the first data store;
    appending, by the journal manager to the journal, a first acceptability verification response entry indicating a positive response to the first acceptability verification request, wherein the positive response is received from the first data store manager;

confirming, by the client-side component, that the journal includes a targeted set of acceptability verification response entries with respective positive responses to the first acceptability verification request;

transmitting, by the client-side component to the journal manager after said confirming, a transaction request to commit the one or more potential state changes;

appending, by the journal manager based at least in part on a result of a commit analysis of the transaction request, a new committed transaction entry indicating that the one or more potential state changes have been approved; and applying, by the first data store manager, one or more writes indicated in the new committed transaction entry.

2. The method as recited in claim 1, wherein the one or more proposed state changes correspond to a new proposed version of a journal schema of the multi-data-store database, wherein the journal schema includes an indication of one or more of (a) a data-store-independent transaction language, or (b) a set of attributes of a data object which is materialized at least in part at the first data store.

3. The method as recited in claim 2, wherein said determining that the one or more proposed state changes meet the acceptance criterion comprises verifying that the new proposed version of the journal schema is compatible with a concrete schema of the first data store.

4. The method as recited in claim 1, further comprising:

appending, by the journal manager on behalf of the client-side component, a second acceptability verification request entry into the journal, wherein the second acceptability verification request entry indicates another potential state change, and wherein the second acceptability verification request indicates a validity period; and detecting, by the client-side component that a second acceptability verification response entry corresponding to the second acceptability verification request has not been added to the journal on behalf of the first data store manager prior to an expiration of the validity period; and determining, by the client-side component in response to said detecting, that a transaction request indicating the other proposed state change is not to be submitted to the journal manager.

5. The method as recited in claim 1, wherein individual ones of entries of the journal comprise a sequence number indicative of an order in which the entries were added to the journal, wherein the first acceptability verification request entry has a particular sequence number, further comprising performing, by the first data store manager:

updating, during a sequential traversal of the journal entries in sequence number order, a processing progress marker to indicate the highest sequence number for which processing of the corresponding journal entry has been completed; and determining, in response to encountering the first acceptability verification request entry during the sequential traversal, the particular sequence number of the first acceptability verification request entry; and prior to determining whether the one or more potential state changes meet the acceptance criterion, setting the processing progress marker to the particular sequence number.

6. A distributed system comprising:

a plurality of nodes implemented at respective sets of one or more computing devices comprising one or more processors and memory, wherein the plurality of nodes include:

a first node configured to:

initiate an addition of an acceptability verification request entry to a journal of the distributed system, wherein the acceptability verification request entry indicates one or more proposed rules for representing state change requests associated with a state machine of the distributed system; and after determining that a targeted set of acceptability verification response entries indicating that the one or more proposed rules meet respective acceptance criteria for processing state change requests at respective nodes of the plurality of nodes have been added to the journal, initiate an addition of a committed transaction entry indicating the one or more proposed rules to the journal; and a second node configured to:

initiate an addition of an acceptability verification response entry to the journal indicating whether the one or more proposed rules meet an acceptance criterion for processing state change requests at the second node; and in response to examining the committed transaction entry, perform one or more write operations indicated in the committed transaction entry.

7. The distributed system as recited in claim 6, wherein the first node comprises a client-side component of a multi-data-store storage system, wherein the second node comprises a data store manager of a particular member data store of the multi-data-store storage system.

8. The distributed system as recited in claim 7, wherein the one or more proposed rules correspond to a new proposed version of a journal schema of the multi-data-store storage system, wherein the journal schema includes an indication of one or more of (a) a data-store-independent transaction language, or (b) a set of attributes of a data object which is materialized at least in part at the particular member data store.

9. The distributed system as recited in claim 8, wherein to determine whether the one or more proposed rules meet an acceptance criterion for processing state change requests at the second node, the data store manager is configured to check whether the new proposed version of the journal schema is compatible with a concrete schema of the particular member data store.

10. The distributed system as recited in claim 6, wherein the targeted set of acceptability verification response entries includes a respective acceptability verification response entry from each node of a selected set of nodes of the distributed system, wherein the selected set includes the second node.

11. The distributed system as recited in claim 10, wherein at least a respective portion of a database whose state changes are managed using the journal is materialized at individual ones of the selected set of nodes.

12. The distributed system as recited in claim 6, wherein the plurality of nodes includes a third node, wherein the acceptability verification request entry indicates a validity period, and wherein the third node is configured to:

in response to encountering, during a sequential traversal of the journal, the acceptability verification entry after the validity period has expired, terminate processing of the acceptability verification entry without initiating an insertion of a corresponding acceptability verification response entry.

13. The distributed system as recited in claim 6, wherein the first node is configured to:

initiate an addition of a second acceptability verification request entry into the journal of the distributed system, wherein the second acceptability verification request entry indicates one or more other proposed rules for representing state change requests associated with the state machine of the distributed system, and wherein the second acceptability verification request indicates a validity period; and in response to determining that a second acceptability verification response entry corresponding to the second acceptability verification request has not been added to the journal on behalf of a particular node of the plurality of nodes prior to an expiration of the validity period, determine that a transaction request indicating the one or more other proposed rules is not to be submitted to a journal manager of the distributed system.

14. The distributed system as recited in claim 6, wherein individual ones of entries added to the journal comprise a sequence number indicative of an order in which the entries were added, wherein the acceptability verification request entry has a particular sequence number, and wherein the second node is configured to:

update, during a sequential traversal of the journal entries in sequence number order, a processing progress marker to indicate the highest sequence number for which processing of the corresponding journal entry has been completed; and determine, in response to encountering the acceptability verification request entry during the sequential traversal, the particular sequence number of the acceptability verification request entry; and prior to determining whether the one or more proposed rules meet the acceptance criterion, set the processing progress marker to the particular sequence number.

15. The distributed system as recited in claim 6, wherein the first node is configured to:

initiate an addition of a second acceptability verification request entry to the journal; and obtaining a responsiveness metric associated with a particular node of the plurality of nodes by determining an indication of a delay between (a) the addition of the second acceptability verification request entry to the journal and (b) an addition of a corresponding acceptability verification response entry into the journal on behalf of the particular node.

16. A non-transitory computer-accessible storage medium storing program instructions that when executed on one or more processors implements a particular node of a distributed system comprising a plurality of nodes, wherein the particular node is configured to:

request an addition of an acceptability verification request entry to a journal of the distributed system, wherein the acceptability verification request entry indicates one or more proposed state changes associated with a state machine of the distributed system;

examine contents of one or more entries added to the journal after the acceptability verification request entry; and after determining that the one or more entries include a targeted set of acceptability verification response entries indicating that the one or more proposed state changes meet acceptance criteria for processing state change requests at respective nodes of the plurality of nodes, request an addition of a committed transaction entry to the journal, wherein the committed transaction entry indicates that the one or more proposed state changes are to be applied at one or more other nodes of the distributed system.

17. The non-transitory computer-accessible storage medium as recited in claim 16, wherein the particular node comprises a client-side component of a multi-data-store storage system, wherein another node of the plurality of nodes comprises a data store manager of a particular member data store of the multi-data-store storage system.

18. The non-transitory computer-accessible storage medium as recited in claim 17, wherein the one or more proposed state changes correspond to a new proposed version of a journal schema of the multi-data-store storage system, wherein the journal schema includes an indication of one or more of (a) a data-store-independent transaction language, or (b) a set of attributes of a data object which is materialized at least in part at the particular member data store.

19. The non-transitory computer-accessible storage medium as recited in claim 17, wherein the targeted set of acceptability verification response entries includes a respective acceptability verification response entry from each node of a selected subset of nodes of the distributed system.

20. The non-transitory computer-accessible storage medium as recited in claim 16, wherein the particular node is configured to:

initiate an addition of a second acceptability verification request entry into the journal of the distributed system, wherein the second acceptability verification request entry indicates one or more other state changes, and wherein the second acceptability verification request indicates a validity period; and in response to determining that a second acceptability verification response entry corresponding to the second acceptability verification request has not been added to the journal on behalf of a first node of the plurality of nodes prior to an expiration of the validity period, determine that a transaction request indicating the one or more other state changes is not to be submitted to a journal manager of the distributed system.

21. The non-transitory computer-accessible storage medium as recited in claim 16, wherein the particular node is configured to:

identify a set of other nodes of the plurality of nodes from which respective positive responses to a second acceptability verification request are to be obtained, wherein the set of other nodes excludes a first node of the plurality of nodes;

request an addition of a second acceptability verification request entry, corresponding to the second acceptability verification request, to the journal of the distributed system, wherein the acceptability verification request entry indicates a different state change associated with the state machine of the distributed system; and in response to determining that a second acceptability verification response entry has been added to the journal, wherein the second acceptability verification response entry indicates that a response to the second acceptability verification request was received from the first node, determine that a request to commit the different state change is not to be submitted to a journal manager of the distributed system.

* * * * *